(12) United States Patent
Yoon et al.

(10) Patent No.: US 9,807,694 B2
(45) Date of Patent: Oct. 31, 2017

(54) MOBILE TERMINAL AND CONTROL METHOD THEREOF

(71) Applicant: LG ELECTRONICS INC., Seoul (KR)

(72) Inventors: Sungyoung Yoon, Seoul (KR); Jieun Lee, Seoul (KR); Seol Namgung, Seoul (KR); Jungmin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 88 days.

(21) Appl. No.: 14/589,810

(22) Filed: Jan. 5, 2015

(65) Prior Publication Data

US 2015/0195789 A1 Jul. 9, 2015

(30) Foreign Application Priority Data

Jan. 6, 2014 (KR) .................. 10-2014-0001434

(51) Int. Cl.
| | |
|---|---|
| *G06F 3/0488* | (2013.01) |
| *H04M 1/725* | (2006.01) |
| *H04W 52/02* | (2009.01) |
| *G06F 1/32* | (2006.01) |
| *H04M 1/67* | (2006.01) |

(52) U.S. Cl.
CPC ...... *H04W 52/0254* (2013.01); *G06F 1/3218* (2013.01); *G06F 1/3231* (2013.01); *G06F 1/3262* (2013.01); *G06F 1/3265* (2013.01); *G06F 1/3287* (2013.01); *G06F 3/0488* (2013.01); *H04M 1/67* (2013.01); *H04M 1/72569* (2013.01); *H04M 1/72577* (2013.01); *G09G 2330/022* (2013.01); *H04M 2250/22* (2013.01); *Y02B 60/1242* (2013.01); *Y02B 60/1282* (2013.01); *Y02B 60/1289* (2013.01); *Y02B 60/50* (2013.01)

(58) Field of Classification Search
CPC .... G06F 3/0488; G06F 1/3218; G06F 1/3231; G06F 1/3265; G06F 1/3262; G06F 1/3287; G06F 3/041; G06F 3/044; G06F 3/0421; G09G 2330/022
See application file for complete search history.

(56) References Cited

U.S. PATENT DOCUMENTS

| | | | |
|---|---|---|---|
| 6,516,421 B1 * | 2/2003 | Peters ................ | H04W 52/027 713/320 |
| 7,538,790 B2 * | 5/2009 | Simmons, Jr. .......... | H04N 5/57 348/173 |

(Continued)

*Primary Examiner* — Md Saiful A Siddiqui
(74) *Attorney, Agent, or Firm* — Birch, Stewart, Kolasch & Birch, LLP

(57) ABSTRACT

A mobile terminal including a terminal body; a touch screen disposed on a front surface of the terminal body, and configured to sense a touch applied to the touch screen; and a controller configured to activate the touch screen in which illumination is turned on, display screen information on the activated touch screen, deactivate the touch screen upon no touch being performed on the touch screen for a predetermined time period associated with an automatic lock function, and in response to a predetermined touch input being sensed by the touch screen within a reference time period before or after the touch screen is deactivated, disable the automatic lock function or reconfigure the predetermined time period.

20 Claims, 32 Drawing Sheets

(56) References Cited

U.S. PATENT DOCUMENTS

| | | | |
|---|---|---|---|
| 9,262,604 B2* | 2/2016 | Kimbrell | G06F 21/31 |
| 2007/0050604 A1* | 3/2007 | Ferren | G06F 8/443 |
| | | | 712/226 |
| 2007/0050654 A1 | 3/2007 | Switzer et al. | |
| 2009/0069056 A1* | 3/2009 | Lee | G06F 1/3203 |
| | | | 455/566 |
| 2011/0256848 A1* | 10/2011 | Bok | G06F 3/04883 |
| | | | 455/411 |
| 2012/0064948 A1 | 3/2012 | Lee et al. | |
| 2013/0222288 A1* | 8/2013 | Lim | G06F 3/041 |
| | | | 345/173 |
| 2013/0244574 A1 | 9/2013 | Okuno et al. | |
| 2014/0094224 A1* | 4/2014 | Lozovoy | H04M 1/22 |
| | | | 455/566 |
| 2014/0191963 A1* | 7/2014 | Murakoshi | G06F 3/03545 |
| | | | 345/158 |

* cited by examiner

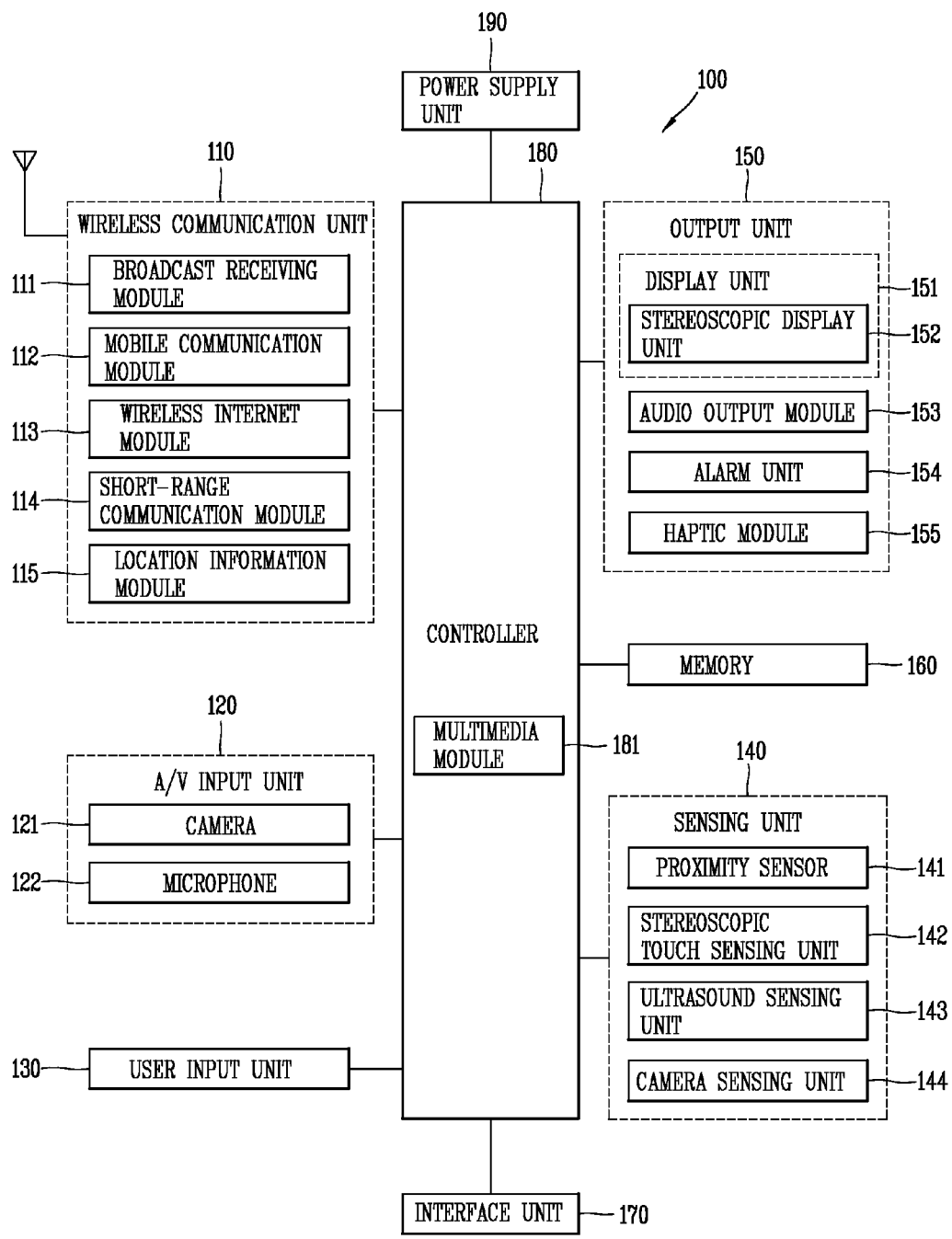

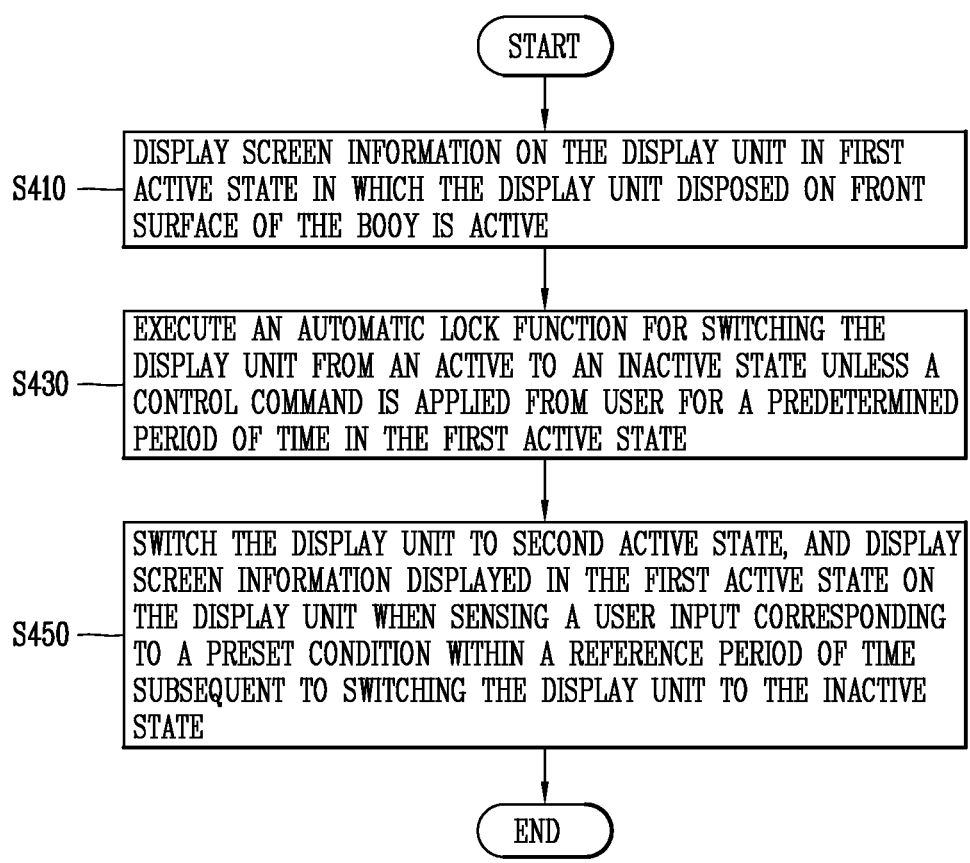

FIG. 5C
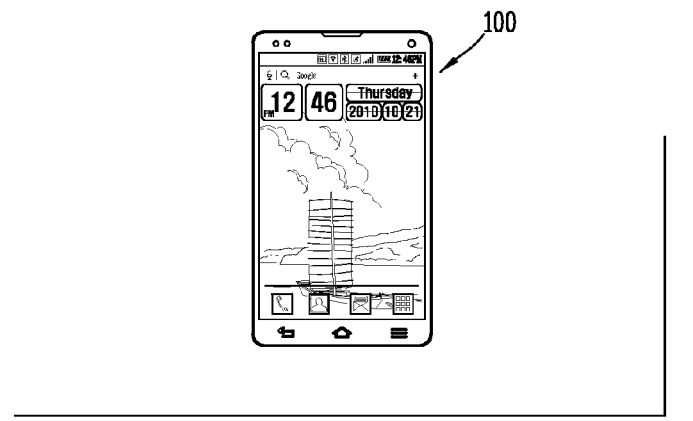
A PREDETERMINED PERIOD OF TIME PASSES
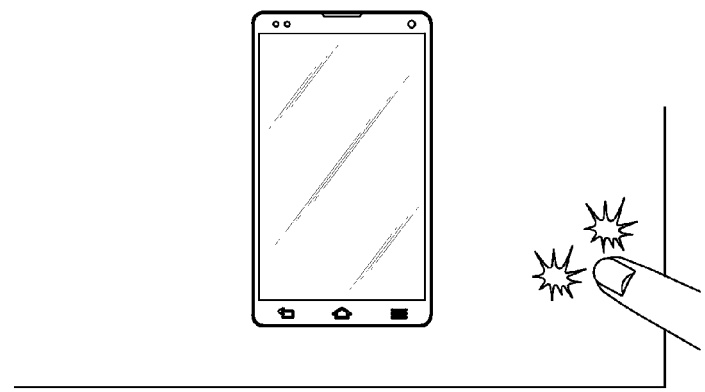
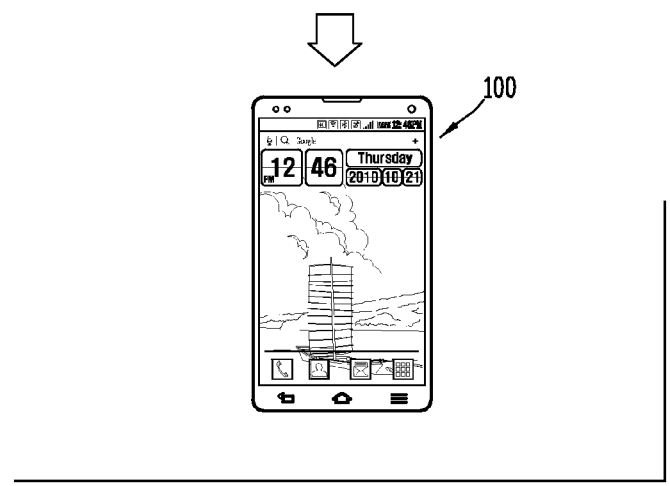

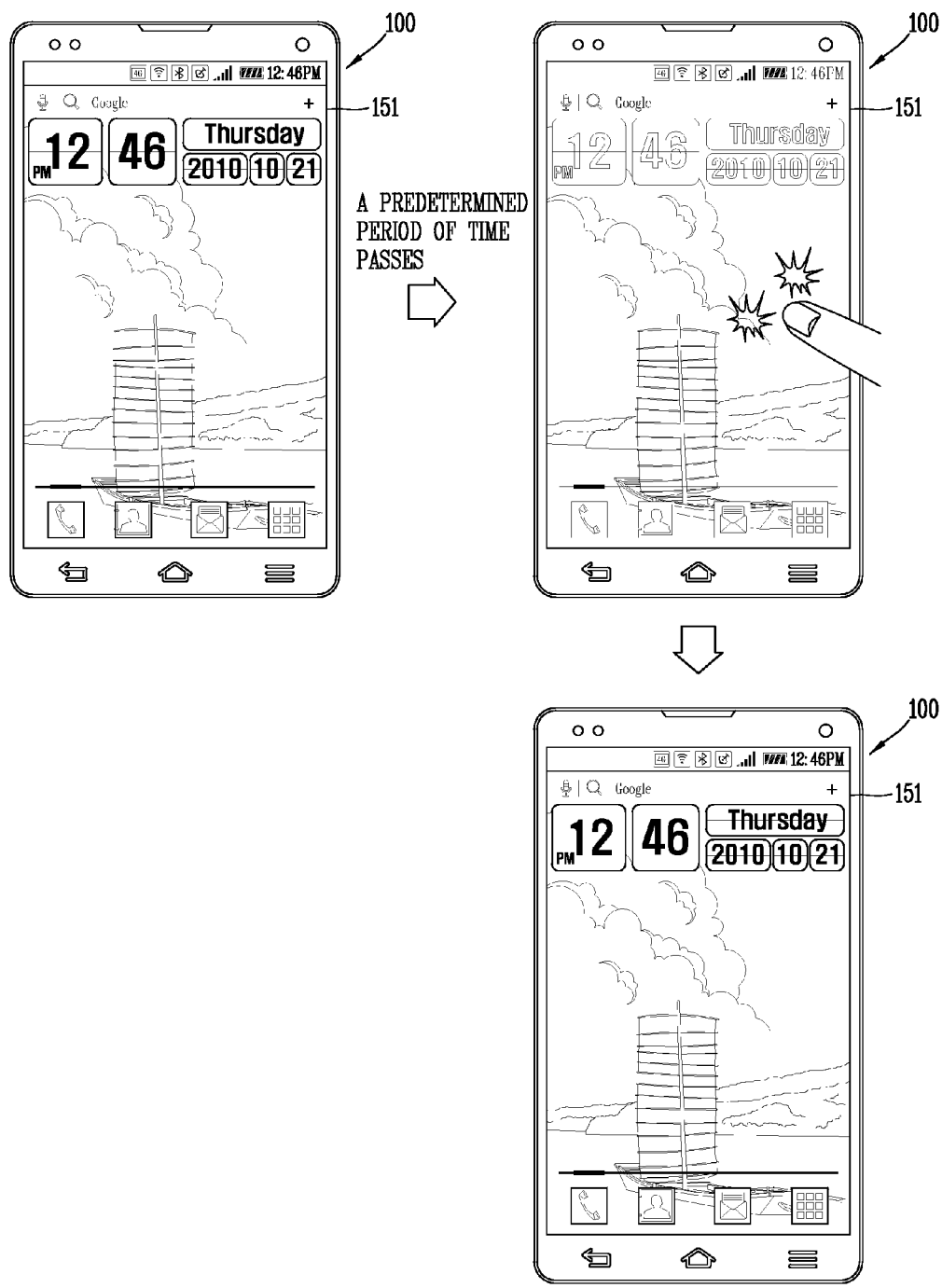

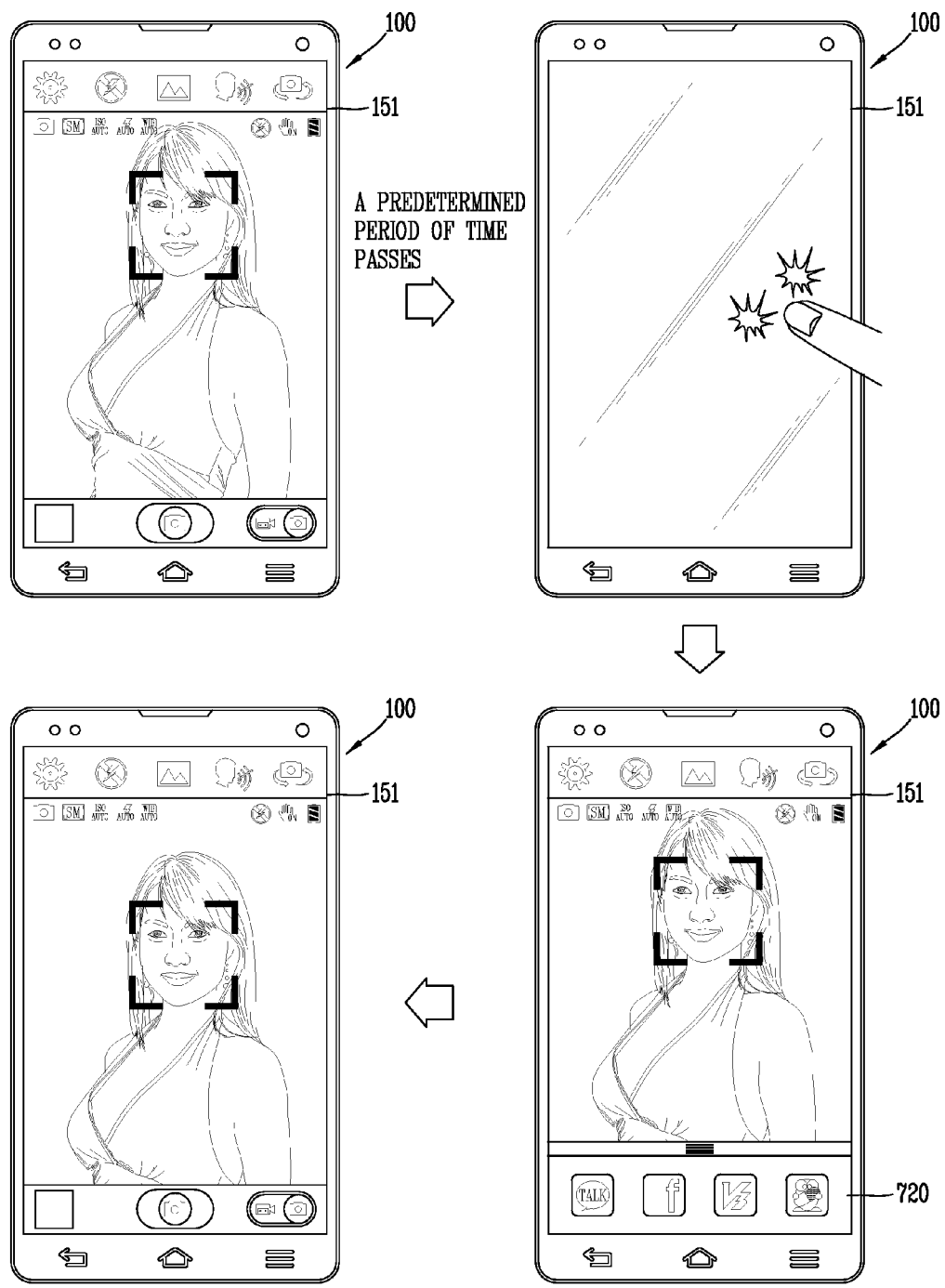

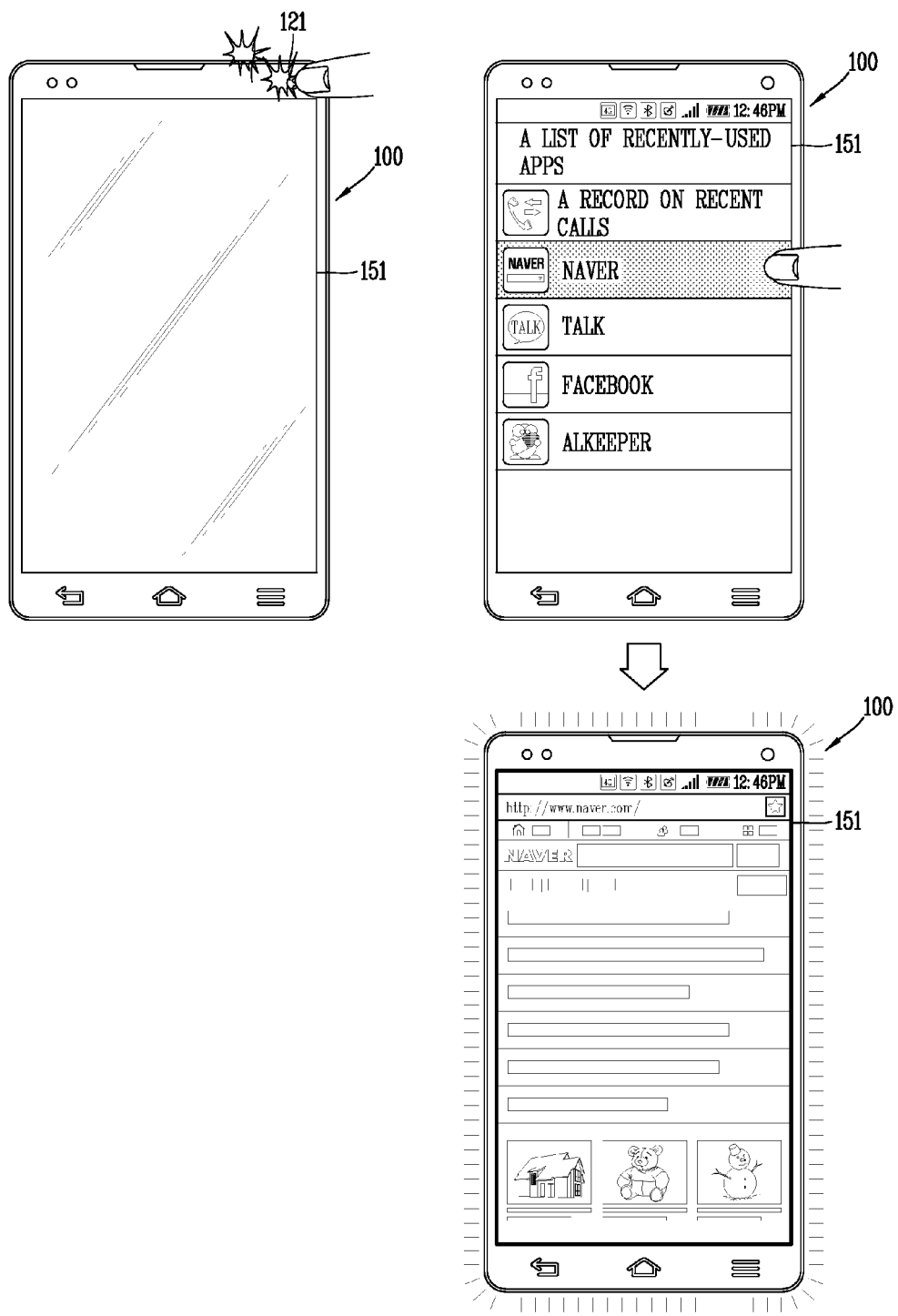

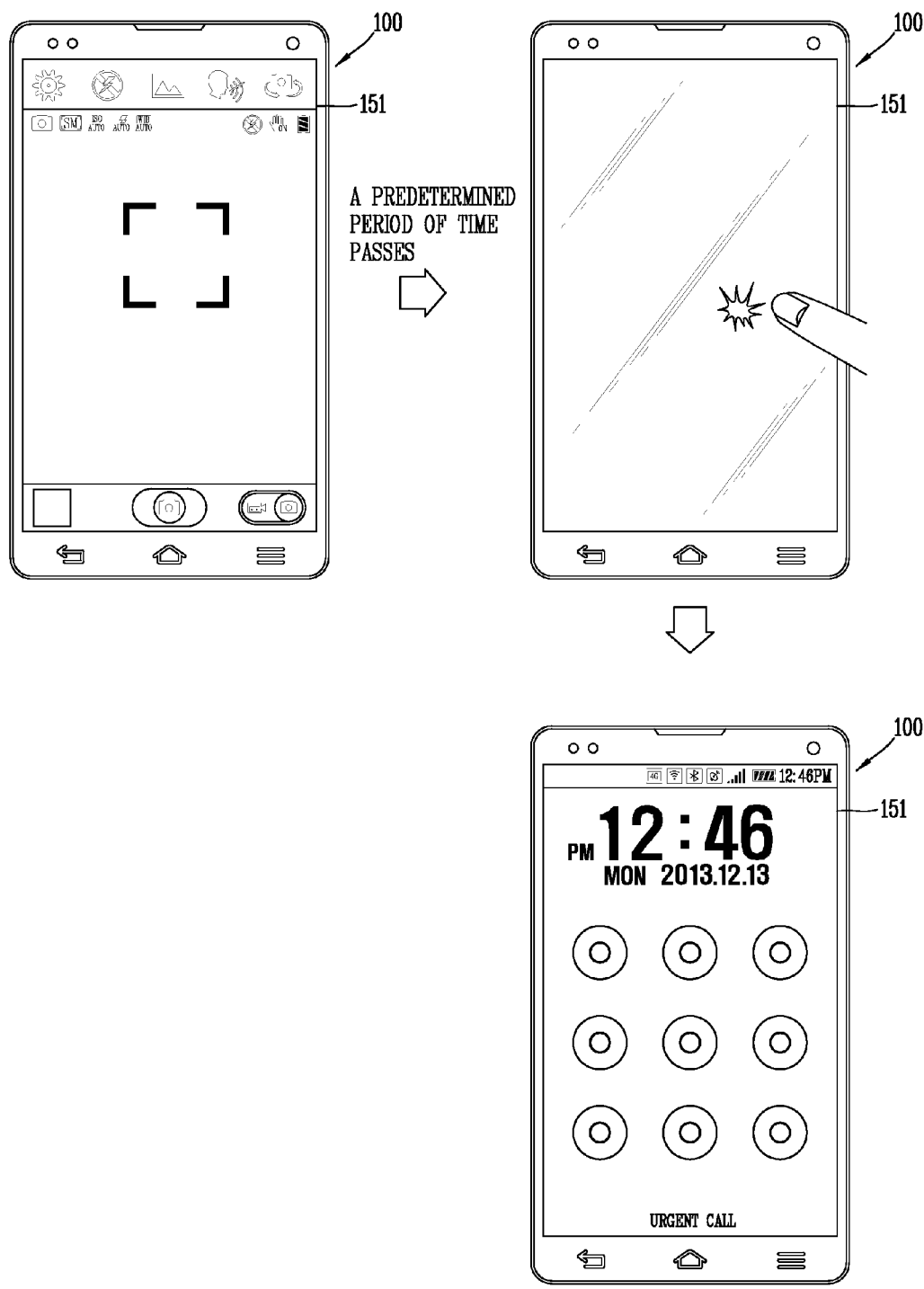

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2014-0001434, filed on Jan. 6, 2014, the contents of which is incorporated by reference herein in its entirety.

BACKGROUND OF THE INVENTION

1. Field of the Invention

The present invention relates to a mobile terminal for switching the display unit to an inactive state unless a user input is applied for a predetermined period of time when the display unit is in an active state, and a control method thereof.

2. Description of the Related Art

Terminals may be divided into mobile/portable terminals and stationary terminals. Also, the mobile terminals may be classified into handheld terminals and vehicle mounted. As it becomes multifunctional, a mobile terminal can capture still images or moving images, play music or video files, play games, receive broadcast and the like, so as to be implemented as an integrated multimedia player.

However, the related art user interface requires complex manipulations, which is inconvenient to the user.

SUMMARY OF THE INVENTION

An aspect of the present invention is to provide a mobile terminal capable of conveniently cancelling an automatic lock function unless a control command is applied from a user for a predetermined period of time and control method thereof.

Another aspect of the present invention is to provide a mobile terminal for changing a setting value associated with the automatic lock function and a control method thereof.

Still another aspect of the present invention is to provide a mobile terminal capable of applying a tap hitting an object to a deactivated display unit to control the terminal and a control method thereof.

To achieve these and other advantages and in accordance with the purpose of the present invention, as embodied and broadly described herein, the present invention provides in one aspect a mobile terminal including a terminal body; a touch screen disposed on a front surface of the terminal body, and configured to sense a touch applied to the touch screen; and a controller configured to activate the touch screen in which illumination is turned on, display screen information on the activated touch screen, deactivate the touch screen upon no touch being performed on the touch screen for a predetermined time period associated with an automatic lock function, and in response to a predetermined touch input being sensed by the touch screen within a reference time period before or after the touch screen is deactivated, disable the automatic lock function or reconfigure the predetermined time period. The present invention also provides a corresponding method of controlling the mobile terminal.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment disclosed in the present invention;

FIG. 4 is a flow chart illustrating a control method of a mobile terminal according to an embodiment of the present invention;

FIGS. 5A, 5B, 5C and 5D are conceptual views for more specifically explaining the control method illustrated in FIG. 4;

FIGS. 6A and 6B are conceptual views illustrating a method of cancelling an automatic lock function based on a tap while executing the automatic lock function in a mobile terminal according to an embodiment of the present invention;

FIGS. 7A and 7B are a conceptual view illustrating screen information displayed on the display unit when the display unit is activated by a tap in a mobile terminal according to an embodiment of the present invention;

FIGS. 10A, 10B and 10C are conceptual views illustrating a method of differently setting a setting value associated with an active state when a tap is sensed at a specific location in a mobile terminal according to an embodiment of the present invention;

FIGS. 11A and 11B are conceptual views illustrating screen information displayed on the display unit when a wrong tap is applied in a mobile terminal according to an embodiment of the present invention;

DETAILED DESCRIPTION OF THE INVENTION

Figure 2A:
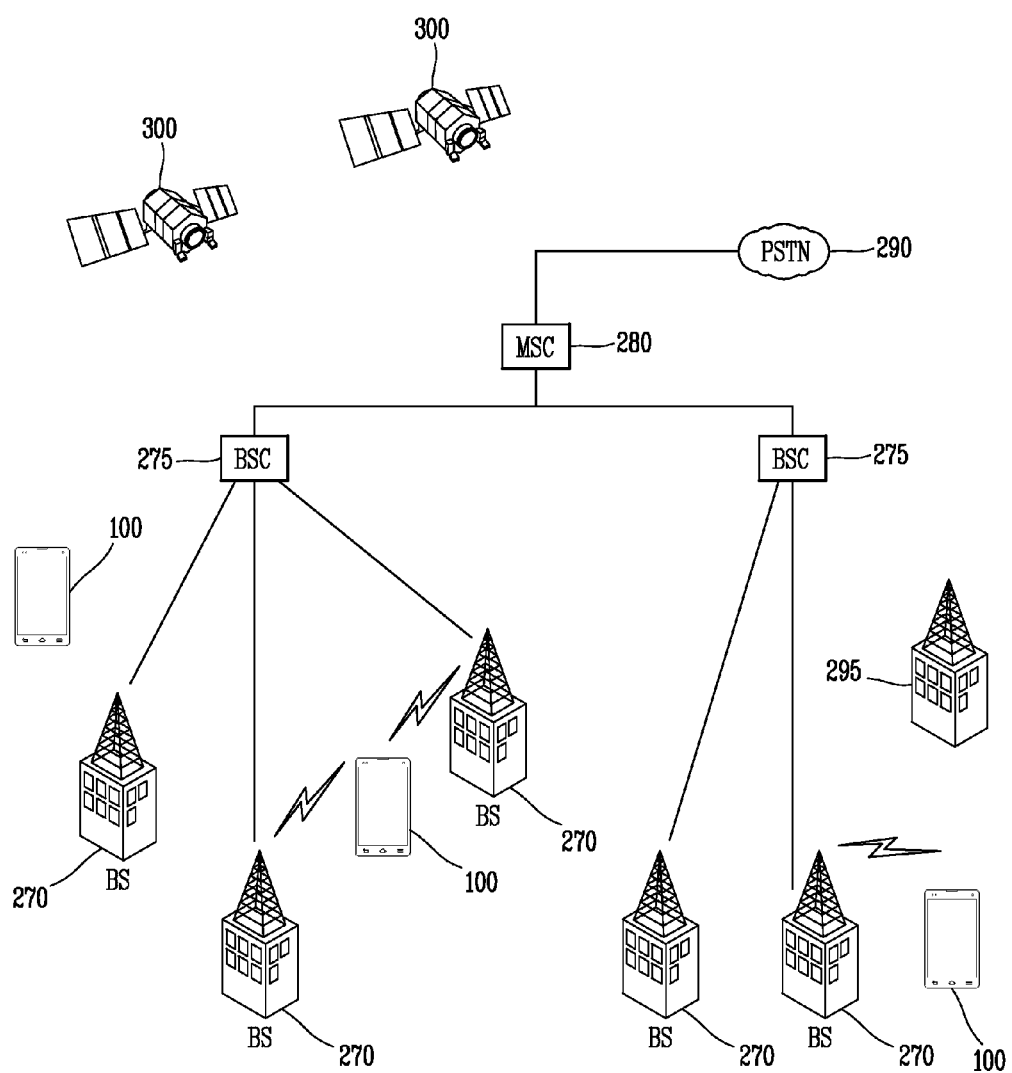
FIGS. 2A and 2B are conceptual views illustrating a communication system in which a mobile terminal according to the present invention is operable.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. Also, it should be noted that the accompanying drawings are merely illustrated to easily explain the concept of the invention, and therefore, they should not be construed to limit the concept of the invention by the accompanying drawings.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present invention. The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems. Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (Wi-Fi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like. The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display. Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image. Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like. The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

Furthermore, for 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit. The stereoscopic processing unit receives a 3D image to extract a left image and a right image from the 3D image, or receives a 2D image to convert it into a left image and a right image.

Further, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 can sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this instance, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, an ultrasound sensing unit 143, and a camera sensing unit 144. The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound. For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor. For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

In another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

An acceleration sensor may sense a movement of the terminal body. For example, the acceleration sensor may a spatial movement of the body based on x, y and z-axes. Moreover, the acceleration sensor 145 may measure a moving speed, an angular speed, or the like of the terminal body as well as a dynamic force thereof such as an acceleration speed, a vibration, a shock, or the like.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

Further, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 can include a multimedia module 181 which provides multimedia playback. The multimedia module 181 may be configured as part of the controller 180 or as a separate component.

In addition, the controller 180 can perform a pattern recognition processing so as to recognize writing or drawing input performed on the touch screen as text or image. Furthermore, the controller 180 can implement a lock state for limiting the user's control command input to applications when the state of the mobile terminal satisfies a preset condition. The controller 180 can also control a lock screen displayed in the lock state based on a touch input sensed through the display unit 151 in the lock state.

The power supply unit 190 receives external and internal power to provide power required for various components under the control of the controller 180. Various embodiments described herein may be implemented in a computer or similar device readable medium using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

Figure 2B:
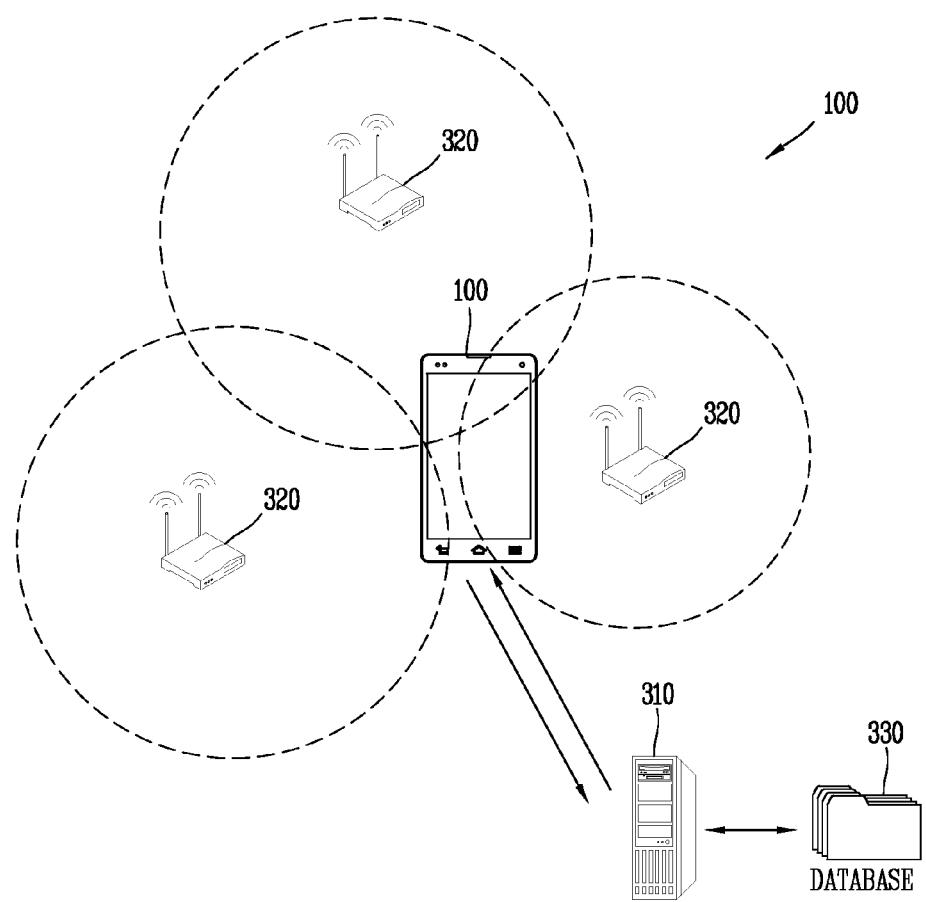

Next, a communication system that can be implemented through the mobile terminal 100 according to the present invention will be described. In particular, FIGS. 2A and 2B are conceptual views illustrating a communication system in which a mobile terminal 100 according to the present invention is operable. First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system. As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this instance, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a Wi-Fi (Wireless Fidelity) positioning system (WPS) will be described with reference to FIG. 2B. The Wi-Fi positioning system (WPS) 300 refers to a location determination technology based on a wireless local area network (WLAN) using Wi-Fi as a technology for tracking the location of the mobile terminal 100 using a Wi-Fi module provided in the mobile terminal 100 and a wireless access point 320 for transmitting and receiving to and from the Wi-Fi module.

The Wi-Fi positioning system 300 may include a Wi-Fi location determination server 310, a mobile terminal 100, a wireless access point (AP) 320 connected to the mobile terminal 100, and a database 330 stored with any wireless AP information. The Wi-Fi location determination server 310 extracts the information of the wireless AP 320 connected to the mobile terminal 100 based on a location information request message (or signal) of the mobile terminal 100. The information of the wireless AP 320 may be transmitted to the Wi-Fi location determination server 310 through the mobile terminal 100 or transmitted to the Wi-Fi location determination server 310 from the wireless AP 320.

The information of the wireless AP extracted based on the location information request message of the mobile terminal 100 may be at least one of MAC address, SSID, RSSI, channel information, privacy, network type, signal strength and noise strength. The Wi-Fi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

Further, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the Wi-Fi positioning system 300 can track the location of the mobile terminal 100.

Next, considering the database 330 stored with any wireless AP information in more detail, various information of any wireless APs disposed at different locations may be stored in the database 330. The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

Thus, any wireless AP information and location information corresponding to the any wireless AP are stored together in the database 330, and thus the Wi-Fi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100. Furthermore, the extracted location information of the mobile terminal 100 may be transmitted to the mobile terminal 100 through the Wi-Fi location determination server 310, thereby acquiring the location information of the mobile terminal 100.

Figure 3A:
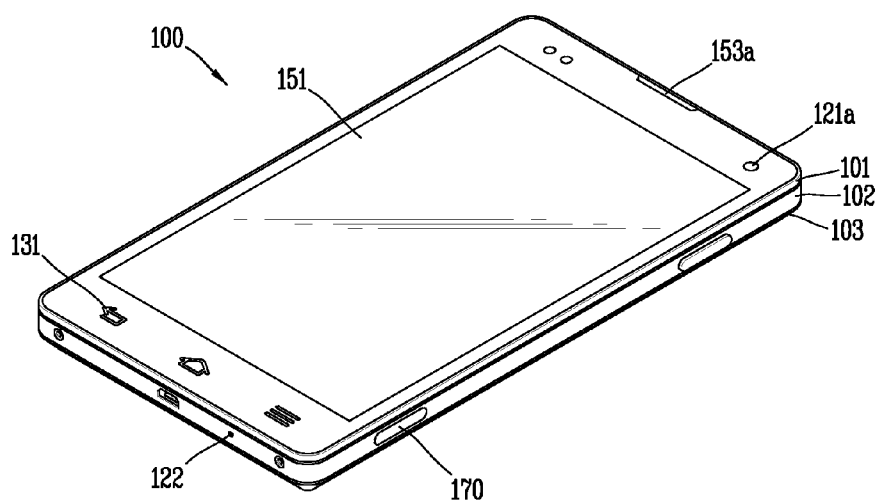
FIG. 3A is a front perspective view illustrating an example of a mobile terminal associated with the present invention.

Hereinafter, a mobile terminal according to an embodiment of the present invention as illustrated in FIG. 1 or a mobile terminal disposed with the constituent elements of the mobile terminal or the structure of a mobile terminal will be described. In particular, FIG. 3A is a front perspective view illustrating an example of the mobile terminal 100 associated with the present invention. The mobile terminal 100 disclosed herein is provided with a bar-type terminal body. However, the present invention is not limited to this, but also can be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102. The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof. The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing mechanism to receive a control command by a touch method. When a touch is made to any one place on the display unit 151, the touch sensing mechanism may be configured to sense this touch and enter the content corresponding to the touched place. The content entered by a touch method may be a text or numerical value, or a menu item capable of indication or designation in various modes.

The touch sensing mechanism may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds. It may be configured such that the sounds generated from the first audio output module 153a are released along an assembly gap between the structural bodies. In this instance, a hole independently formed to output audio sounds may not be seen or hidden in terms of appearance, thereby further simplifying the appearance of the mobile terminal 100. However, the present invention is not limited to this, and a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

FIG. 3A illustrates the first manipulation unit 131 is a touch key, but the present invention may not be necessarily limited to this. For example, the first manipulation unit 131 may be configured with a mechanical key, or a combination of a touch key and a mechanical key. The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being output from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
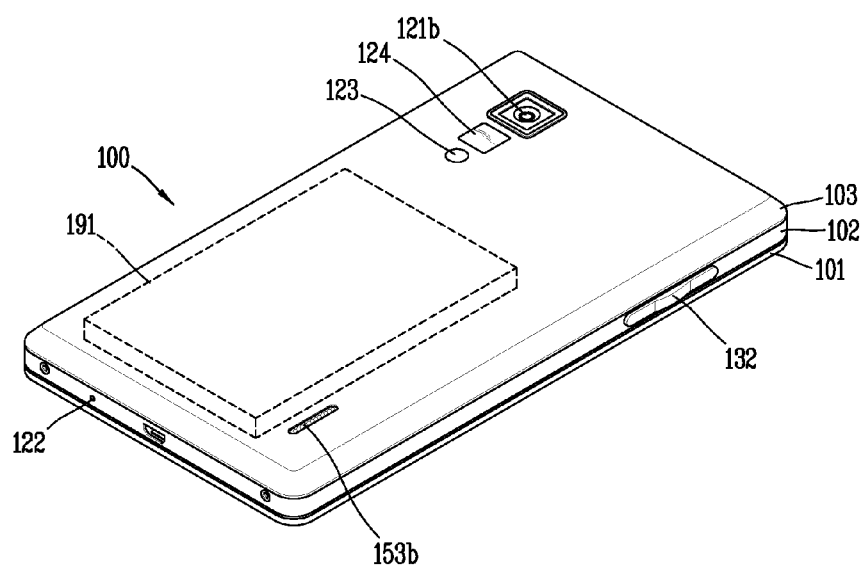
FIG. 3B is a rear perspective view illustrating a mobile terminal illustrated in FIG. 3A.

FIG. 3B is a rear perspective view illustrating mobile terminal 100 illustrated in FIG. 3A. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121*b* has a relatively large number of pixels since the user often captures a general object that is not sent immediately. The first and the second camera 121*a*, 121*b* may be provided in the terminal body in a rotatable and popupable manner.

In addition, a flash 123 and a mirror 124 may be additionally disposed adjacent to the second camera 121*b*. The flash 123 illuminates light toward an object when capturing the object with the second camera 121*b*. The mirror 124 allows the user to look at his or her own face, or the like, in a reflected way when capturing himself or herself (in a self-portrait mode) by using the second camera 121*b*.

A second audio output unit 153*b* may be additionally disposed at a rear surface of the terminal body. The second audio output unit 153*b* together with the first audio output unit 153*a* (refer to FIG. 3A) can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Furthermore, a mobile terminal according to an embodiment of the present invention including at least one of the foregoing constituent elements can control a function of the mobile terminal in response to a tap or tap gesture hitting a terminal body or a position out of the body. For example, unless a user input is applied (or a control command is applied from a user) for a predetermined time period while the display unit of the terminal is in an active state, an automatic lock function for switching the display unit to an inactive state is performed. When the automatic lock function is executed, the controller 180 deactivates the display unit, and ignores a touch applied to the deactivated display unit.

Further, a mobile terminal according to an embodiment of the present invention activates the display unit in response to a user input formed by at least one of a tap and a touch, and displays screen information that has been displayed just prior to executing an automatic lock function. Accordingly, even if a touch input to the mobile terminal is not applied, it may be possible to perform control on a function associated with the mobile terminal with a simple gesture hitting an object.

Hereinafter, a mobile terminal and a control method thereof capable of providing a new user interface based on a tap hitting an object will be described in more detail with reference to the accompanying drawings. In particular, FIG. 4 is a flow chart illustrating a control method of a mobile terminal according to an embodiment of the present invention.

First, the controller 180 displays screen information on the display unit in a first active state in which the display unit disposed on a front surface of the body is active (S410). Here, an "active state in which the display unit is active" denotes a state in which illumination provided therein to illuminate the display unit 151 is on. In other words, when the display unit 151 is in an active state, various screen information are displayed on the display unit 151 under the control of the controller 180.

Here, screen information as a graphic image that can be displayed on the display unit 151 is irrelevant to the type thereof. For example, the screen information may be an execution screen of an application, and thus may be an electronic document screen, a music play screen, an address book screen or a home screen page. In another example, the screen information may be a home screen page including at least one object such as an icon or widget of an application installed in the mobile terminal. The home screen page and an execution screen due to one or more applications may be overlapped to display one screen information.

Next, unless a control command is applied for a predetermined time period from a user in the first active state, the process of executing an automatic lock function for switching the display unit from an active state to an inactive state is performed (S430). The controller 180 executes an automatic lock function based on the user's control or setting of the execution of the automatic lock function while displaying screen information. The automatic lock function denotes a function for switching the display unit in an active state to an inactive state unless a user input is applied for a predetermined time period to prevent a battery from being consumed regardless of the user's intention or a signal input unit (or button portion) formed to turn on or off the display unit is pressed. When the automatic lock function is executed, it is possible to prevent a touch input from being applied while the display unit 151 is in an inactive state.

Here, an "inactive state in which the display unit 151 is inactive" denotes a state in which illumination provided therein to illuminate the display unit 151 is off. In other words, in an inactive state, any information or graphic image is not displayed on the display unit 151. Further, a predetermined time period which is an execution condition of the automatic lock function may be modified in various ways according to the terminal, and changed by the user. Also, when the automatic lock function is executed, the controller 180 stores screen information that was displayed on the display unit just prior to executing the automatic lock function. At this time, the controller 180 can store a type of application that should be executed to display the relevant screen information, link information for displaying the relevant screen information, and the like along with the screen information in the memory 160.

Next, when a user input to the body corresponding to a preset condition is sensed within a reference time period after the display unit is switched to the inactive state, the process of switching the display unit to a second active state, and displaying screen information displayed in the first active state on the display unit is performed (S450).

The user input corresponding to a preset condition includes at least one of a tap hitting the body or a position out of the body and a touch to the body. For example, the user input corresponding to a preset condition may be defined as a tap for consecutively hitting a predetermined region twice or defined as a long touch in which a touch is maintained for a preset time period.

Hereinafter, for the sake of convenience of explanation, the user input corresponding to a preset condition that is formed by a tap hitting an object will be described as an example, but is not necessarily limited to this. In other words, the user input corresponding to a preset condition may be formed in various ways using at least one of a tap and a touch. Further, the sensing unit 140 senses a user input applied to the body regardless of whether the display unit 151 is active or not, and determines whether or not the sensed user input corresponds to a preset condition.

Here, a tap or tap gesture may denote a gesture hitting the terminal body 100 or object. More specifically, a tap may be understood as an operation of lightly hitting the mobile terminal body 100 or an object with a tap object such as a finger or the like or allowing a tap object to be lightly in contact with the mobile terminal body 100 or an object.

In addition, a tap object applying such a tap may be a thing capable of applying an external force to the mobile terminal body 100 or an object, for example, a finger (a fingerprint portion), a stylus pen, a pen, a pointer, a fist (finger joint) or the like. Meanwhile, the tap object may not be necessarily limited to a thing capable of applying a touch input to the mobile terminal according to the present invention, and irrelevant to the type thereof if it is a thing capable of applying an external force to the mobile terminal body 100 or an object.

Further, an object to which a tap is applied may include at least one of the terminal body and a position out of the body. In other words, an input region of the mobile terminal can be extended to an outside of the terminal body. Accordingly, a position capable of sensing the tap on a position out of the terminal body may be a virtual input region.

In addition, an area of the virtual input region may vary according to a place or object on which the terminal is placed or a strength of the tap. For example, when the terminal is placed on a table, and the user hits the table, a movement of the terminal is generated and the tap can be sensed through this. Accordingly, when increasing the strength of the hit, the virtual input region may increase. In another example, when the user picks up the terminal body, the virtual region may disappear.

Further, during the process of sensing a tap, the controller 180 can determine that a "knockknock (or knock-on)" for the purpose of controlling the mobile terminal is sensed. For example, when a tap is applied to the display unit 151 once by a touch object capable of applying a touch to the display unit 151, the controller 180 can recognize the single tap as a touch input. In other words, the reception of a control command by the user is restricted when the display unit 151 is in an inactive state, and thus when a user input is recognized as a touch input other than a tap, the controller 180 can ignore the user input. Accordingly, only when at least two or more (or a plurality of) consecutive taps are applied within a limited time period, the sensing unit 140 may compare the sensed tap with a preset tap.

Hereinafter, consecutively sensing at least two or more taps within a limited time period is referred to as a "knockknock (or knock-on)". For example, when a second tap is sensed within a limited time period from a time point at which a first tap is sensed, the controller 180 recognizes that a "knock-on" is sensed. Accordingly, hereinafter, sensing a "knock-on" denotes sensing the hitting of an object to the terminal body or a position out of the body substantially a plural number of times.

In addition, when the sensing unit 140 corresponds to a touch sensor, the sensing unit 140 can sense a "knock-on" in a different manner according to whether or not the display unit 151 is active. For example, when the display unit 151 is active, the touch sensor can execute an active mode for maintaining an active state since the controller 180 should immediately responds to a user input. On the contrary, when the display unit 151 is inactive, the touch sensor can execute a doze mode in which an active state and an inactive state are switched with a preset period to save the battery. In other words, when the display unit 151 is inactive, the touch sensor may execute the doze mode to be active for each preset period.

Further, decreasing a period of time for which the touch sensor is active increases a speed for sensing a "knock-on" applied to the display unit 151, but accordingly, the power consumed due to the touch sensor increases. On the contrary, increasing a period of time for which the touch sensor is active decreases a speed for sensing a touch applied to the display unit 151 though decreasing power consumed due to the touch sensor 140.

Accordingly, the preset period of time may be set fast enough that the sensing speed is unable to be recognized by the user in sensing a touch applied to the display unit 151 as well as to enhance an efficiency of power consumption. For example, the preset period of time may be set to be active about 30 number of times (Hz) per second. It may correspond to a minimum current level at which the display unit 151 can recognize a touch when the display unit 151 is in an inactive state.

Also, the touch sensor may execute a doze mode when the display unit 151 is in an inactive state, and execute the active mode when a first tap is applied to the display unit 151. In other words, when it is determined that a tap is applied while the display unit 151 is in an inactive state, the touch sensor may execute an active mode to more accurately sense a tap to be applied afterwards. For example, when the active mode is executed, the touch sensor may be set to be active about 120 number of times (120 Hz) per second.

Further, when a second tap is not sensed within a predetermined time period from a time point at which a first tap is applied, the touch sensor may switch an active mode to a doze mode. It is to prevent a malfunction from occurring in the terminal since a user's unintentional tap has occurred. In addition, the sensing unit 140 may further include at least one of an acceleration sensor for sensing a tap using a movement of the body, a sound sensor for sensing a tap using a sound generated around the body, a proximity sensor for sensing a tap based on the existence or absence of an object located around the body, and a pressure sensor for sensing a tap using a pressure applied to the body.

Similarly to the touch sensor, the remaining sensors included in the sensing unit 140 may be deactivated while the display unit 151 is in an inactive state or activated with a preset period. This is to reduce power consumption due to sensors. In other words, when a first tap is sensed while the display unit 151 is in an inactive state, the controller 180 can activate one or more sensors included in the sensing unit 140 to more accurately sense a second tap to be applied afterwards. The one or more sensors may include a touch sensor, a microphone sensor, a proximity sensor, a RGB sensor, a pressure sensor, and the like, and may be used to distinguish the characteristics of a "knock-on" (an intensity of tap, a location of tap, a time distance between the first and the second tap, an object of tap, a strength of tap, an area of tap, a pattern of tap, and the like).

For example, the touch sensor may sense a tap using a touch generated on the body. Furthermore, the touch sensor may calculate a location to which the tap is applied, and distinguish an object of tap (for example, a finger, a nail, a palm, etc.). In another example, the microphone sensor may sense a tap using a sound generated around the body. Furthermore, since sound has an inherent frequency characteristic, the microphone sensor can distinguish an object of tap (for example, a finger, a nail, a palm, a pen, etc.) and the characteristic of a tap.

In still another example, when an object adjacent to a front surface of the body is detected by the proximity sensor even though a "knock-on" is sensed by the acceleration sensor, the controller 180 can reject the "knock-on". This is because the mobile terminal 100 placed in a bag may malfunction due to the bag shaking. In still another example, the RGB sensor may sense a color for an object of tap, and distinguish the type of the object using the sensed color. In other words, the present invention may distinguish between a finger and a touch pen using the RDB sensor.

In still another example, the pressure sensor may sense a tap using a pressure applied to the body, and calculate a strength of the pressure generated by the tap. In still another example, when a pressure is applied in a specific direction, a piezo sensor (or shock sensor) using the properties generated by electricity on a surface of crystal may sense a tap. The piezo sensor can sense a movement corresponding to several thousand Hertz (kHz) whereas the acceleration sensor senses a movement corresponding to several hundred Hertz, thereby more accurately sensing the movement (or shock) of the terminal.

In addition, the controller 180 can figure out the object and pattern of the foregoing tap using the piezo sensor. More specifically, the piezo sensor can figure out the object of tap and the pattern of tap using a physical pattern acquired in an experimental manner. The physical pattern acquired in an experimental manner can be prepared at factory shipment and stored in the memory 160, and periodically updated or changed by the user.

Further, a mobile terminal according to an embodiment of the present invention may use only either one of the acceleration sensor and touch sensor to sense a tap to the mobile terminal body or sequentially use the acceleration sensor and touch sensor or concurrently use the acceleration sensor and touch sensor. Meanwhile, a mode in which only the acceleration sensor is used may be named as a first mode, a mode in which the touch sensor is used as a second mode, and a mode in which both the acceleration sensor and touch sensor are (concurrently or sequentially) used as a third mode or hybrid mode. In addition, the controller 180 can determine whether or not a "knock-on" is sensed by collectively taking sensing signals generated from the foregoing sensors into consideration. As a result, it is possible to accurately determine the characteristics of a tap such as a location at which the tap is sensed or the like.

When a "knock-on" hitting the body is sensed, the controller 180 can determine whether or not the sensed "knock-on" matches a tap (or preset tap) corresponding to a condition stored in the memory 160. The preset tap is formed by a plural number of taps. Here, the preset tap may be set in various ways according to a number of times for which the taps are applied, an absolute/relative location at which the taps are applied, an input speed (or rhythm) of the taps, a sequence in which the taps are applied, a number of tap objects contained in one tap (for example, one finger tap or two finger taps), an area to which the tap is applied, an intensity of tap, whether or not a contact with the body due to the tap is maintained (tap and hold), and the like. Hereinafter, for the sake of convenience of explanation, the embodiments in which a preset tap is set by the first and the second tap will be described below, but is not limited to them. In other words, various patterns may be set to a preset tap by two or more taps such as a third tap or the like.

According to an embodiment, the controller 180 can distinguish a pattern of tap sensed based on an absolute location at which the tap is applied. For example, a preset pattern may be a pattern in which a second tap hitting the body or a second position out of the body once is applied after an hour has passed from a time point at which a first tap hitting the body or a first position out of the body once. Here, the controller 180 can set a pattern based on the absolute location of the first and the second position by assuming a virtual region in which a front surface of the terminal body is extended to the outside thereof as a two-dimensional coordinate plane. In other words, only when the first and the second tap are accurately applied to the first and the second position, the controller 180 can determine that the pattern of the sensed tap corresponds to a preset pattern.

According to an embodiment, the controller 180 can distinguish a pattern of tap sensed based on the relative location of the first and the second tap. When a second tap is applied to a location that satisfies a preset distance and angle from a location of the first tap initially applied based on a virtual reference axis on the basis of the direction of gravity, the controller 180 can determine that the sensed pattern of tap corresponds to a preset pattern. For example, a location apart from a first position at which the first tap is sensed by 5 cm, for which the first position is used as a starting point, and an angle of 30 degrees is formed based on a virtual reference axis on the basis of the direction of gravity using may be set to a second position at which a second tap should be sensed. As described above, when a preset pattern is based on the absolute location, a location to which the second tap should be applied varies according to a location to which the first tap is applied.

According to an embodiment, the controller 180 can distinguish a pattern of the sensed tap based on a time difference between the first and the second tap. In other words, a different pattern may be set according to a speed (or rhythm) at which the tap is entered. For example, a pattern for which the tap is entered twice within one second and a pattern for which the tap is entered three times correspond to different patterns.

In addition, the controller 180 can distinguish a pattern of the sensed tap based on whether or not a contact with the tap object is released like a Morse code. For example, an operation of lightly hitting an object corresponds to a dot of Morse code, and an operation in which the contact is not released for a predetermined period of time while being in contact with the object corresponds to a dash (or line) of Morse code. For example, "knockknock", "knock-knock", and "knockknock-" are cases where two taps are applied, but correspond to different patterns.

Furthermore, the controller 180 can produce the number of tap objects contained in one tap. For example, when a tap is performed with two fingers, two tap objects may be included in one tap. The controller 180 can discern the pattern of a tap based on the number of tap objects being produced.

In addition, the pattern of a sensed tap may be discerned according to an intensity of the tap (strong or weak), a type of the tap object (finger or touch pen), an area of the tap (thumb or index finger), an order of the tap, an area to which the tap is applied and the like. In other words, the predetermined pattern may be associated with at least one of a number of times, a location, a speed, a strength, a region to which the tap is applied, and a type and a number of the tap objects.

Further, the controller 180 can compare the pattern of a sensed tap with a preset pattern (or preset tap) based on at least one of a number of times, a location, a speed, a strength, a region to which the tap is applied, and a type and a number of the tap objects. Information on the preset tap may be stored in the memory 160, and the controller 180 can calculate a matching rate based on the comparison result, and determine that the pattern of a sensed tap corresponds to a preset pattern when the matching rate is greater than a reference value.

In addition, when the sensed "knockknock" corresponds to a preset tap, the controller 180 switches the display unit from an inactive state to an active state, and displays screen information displayed in a first active state. The function is referred to as "screen on".

In general, in order to redisplay screen information that has been displayed just prior to deactivation when the display unit in an inactive state, the pressing of the signal input unit (or button portion) for reactivating the display unit is required. When the signal input unit is pressed, the display unit is switched from an inactive state to an active state, and a lock screen for preventing a malfunction due to an unintentional touch is displayed on the display unit. In other words, the user can recheck a screen displayed just prior to executing an automatic lock function only when he or she applies a plurality of inputs to the mobile terminal (or through a plurality of steps).

In addition, when an automatic lock function is linked with a password lock function, the mobile terminal is switched to a lock state while at the same time executing the automatic lock function. Here, a lock state denotes a state in which the reception of a control command by a user is limited, and refers to a state in which the lock is released only when a password set by a specific person is entered. When the display unit 151 is activated in the lock state, the lock screen may include a virtual keypad or the like formed to receive a password.

On the contrary, when a gesture hitting the terminal with "knockknock" subsequent to executing the automatic lock function is sensed, a mobile terminal according to an embodiment of the present invention immediately activates the display unit 151 and redisplays screen information displayed just prior to executing the automatic lock function. Since the automatic lock function is automatically executed unless a user input is applied for a predetermined period of time, the automatic lock function may be executed against the user's intention. However, a mobile terminal according to the present invention can cancel the automatic lock function and password lock function using a simple gesture tapping the terminal, thereby enhancing user convenience. In other words, according to the foregoing driving method, a lock state can be released based on the pattern of a tap while the display unit 151 is in an inactive state, thereby implementing a convenient user interface.

Furthermore, the related art has a drawback in which the display unit 151 is activated using a button or the like and a password is entered using a virtual keypad contained in the lock screen to release a lock state. However, the foregoing embodiment solves the drawback. As a result, a mobile terminal according to an embodiment of the present invention can be immediately released using a plurality of taps when the display unit is in an inactive state to display preset screen information. In other words, a user can release the terminal even without entering a password on the display unit displayed with a lock screen.

Thus, the user can control the terminal with a new form even while the display unit is in an inactive state. Further, both a first active state and a second active state denote a state in which the display unit is in an active state. An ordinal number expression such as first, second, and the like is used to distinguish between an active state prior to executing the automatic lock function and a state subsequent to executing the automatic lock function. For example, the first active state denotes an active state prior to executing the automatic lock function, and the second active state denotes an active state subsequent to executing the screen-on function.

The first and the second active state refer to a state in which one or more executable function are executed in the terminal, and an execution screen is displayed on the display unit 151 in which illumination is turned on according to the execution of the functions. In other words, the first and the second active state denote a state in which the terminal is operated as a state in which the execution screen of a specific function is displayed on the display unit 151 in which illumination is turned on.

Further, the first and the second active state may be switched to an inactive state. When the first and the second active state are switched to an inactive state, a function being executed during the switching is suspended, and the illumination of the display unit 151 is switched from on to off. In other words, the inactive state denotes a state in which the illumination of the display unit 151 is turned off. In the inactive state, a function being executed when an active state is switched to an inactive state may be suspended or continuously executed on the background though the execution screen thereof is not displayed on the display unit 151. The inactive state as a state in which the terminal is in a standby mode with low power consumption is distinguished from a power-off state in which the power of the terminal is completely turned off.

When an inactive state is switched to an active state, the illumination of the display unit 151 is switched from off to on. At this time, the type of screen information displayed on the display unit 151 in which illumination is turned on varies according to the state of the terminal and the type of an event generated from the terminal. The example of the state of the terminal may include a lock state, a lock release state, and the like, and the example of the event generated from the terminal may include a call signal reception, a message reception, a key signal input, a touch input, and the like.

Further, according to the screen-on function, screen information displayed in the first active state should be displayed as it is even in the second active state, and thus the controller 180 stores screen information that has been displayed just prior to executing the automatic lock function in the memory 160. When an execution screen due to the application is contained in the screen information, the controller 180 stores application information for displaying the execution screen and the link information of the execution screen that has been displayed just prior to executing the automatic lock function in the memory 160. When the screen-on function is executed to allow the display unit 151 to be in the second active state, the controller 180 displays screen information that has been displayed in the first active state on the display unit 151 using the information stored in the memory 160.

However, screen information displayed in the first active state and screen information displayed in the second active state may not be necessarily matched to each other. For example, an application associated with a camera may be executed in the first active state to display an execution screen associated with the camera, and an image captured in the camera may be contained in the execution screen. Subsequently, when an automatic lock function is executed while the execution screen associated with the camera is displayed as screen information, and then it is in the second active state due to a tap, the execution screen of an application associated with the camera is displayed as screen information. However, an image captured in the camera may vary according to the movement of the body.

In addition, when the screen-on function is executed by "knockknock", the controller 180 can display a recent apps list or favorite apps list on screen information displayed in the first active state on the display unit 151. In other words, the recent apps list or favorite apps list may be displayed in at least partial region of the display unit 151. It is to provide an interface capable of conveniently switching the screen as the display unit 151 is switched from an inactive state to an active state by "knockknock".

Further, the recent apps list may include at least one shortcut icon, and the shortcut icon is formed to execute an application corresponding to the shortcut icon. Furthermore, the type of the shortcut icon varies according to the type of an application executed in the first active state. In addition, the recent apps list or favorite apps list displayed in the second active state may disappear from the display unit 151 by the user's input or controller. For example, when a predetermined period of time has passed from a time point at which the screen-on function is executed, the recent apps list or favorite apps list may not be displayed on the display unit 151.

In addition, according to an embodiment of the present invention, the controller 180 sets an active time associated with the second active state in response to a tap sensed by the sensing unit 140 when the display unit 151 is in an inactive state. Furthermore, unless a user input is applied for the set active time after the display unit 151 is switched to the second active state, the controller 180 deactivates the display unit 151.

In other words, the automatic lock function is executed unless a user input is applied for a predetermined period of time in the first active state, and executed unless a user input is applied for the preset active time in the second active state. In other words, when the second active state is executed by "knockknock", the controller 180 executes the automatic lock function based on the active time rather than the predetermined period of time. For example, the automatic lock function may be executed unless a user input is applied for "10 seconds" in the first active state, and executed unless a user input is applied for "1 minute" in the second active state.

The reactivation of the display unit 151 by "knockknock" (or execution of the screen-on function) denotes that the user has an intention to continuously use the mobile terminal. Accordingly, when the screen-on function is executed by "knockknock", the controller 180 executes an active time which is relatively greater than a predetermined period of time. When the screen-on function is executed by "knockknock", the active time is set, but the active time will be applied for a limited period of time. In other words, when the display unit 151 is activated due to other reasons than "knockknock", the automatic lock function is executed based on the predetermined period of time set to default other than the active time.

Further, according to the present invention, information on a plurality of preset taps for allowing the mobile terminal to execute the screen-on function may be stored in the memory 160. Control information for setting a different time may correspond to the plurality of preset taps, respectively.

Control information for setting different active information corresponding to the plurality of preset taps, respectively, may be stored in the memory 160. In other words, the active time set by the controller 180 can vary according to which one of the plurality of preset taps is sensed. For example, the controller 180 sets a first time as the active time upon sensing a preset first tap, and sets a second time which is different from the first time as the active time upon sensing a second tap which is different from the first tap.

In other words, the controller 180 can execute a screen-on function in response to a tap sensed by the sensing unit 140, and set a different active time based on the sensed tap. For example, the active time may vary according to at least one of the sensed tap count and intensity. Further, a preset tap for executing the screen-on function and an active time corresponding to the preset tap may be stored in the memory 160 at factory shipment, or added, deleted or edited by the user of the terminal. In addition, any one of a plurality of preset taps may be a tap for executing the screen-on function and deactivating the automatic lock function. When the automatic lock function is deactivated, the display unit 151 maintains an active state until the signal input unit (or button portion) formed to turn on or off the display unit 151 is pressed. For example, the signal input unit is a power button, and the display unit 151 is deactivated only when the power button is pressed by the user when the automatic lock function is in an inactive state. In other words, the active time may be set to infinite.

Further, any one of a plurality of preset taps may be a tap for executing the screen-on function, and displaying a graphic object associated with an input of the active time on screen information displayed on the display unit to receive the active time from the user. For example, a preset tap for executing the screen-on function may include a first tap hitting the body by a first reference number of times within a preset period of time and a second tap hitting the body by a second reference number of times within a preset period of time subsequent to applying the first tap. Further, when the second tap maintains a contact without being released from the state of being in contact with the body, the controller 180 can display the graphic object at a location corresponding to the second tap. The location displayed with the graphic object varies according to a location at which the second tap is sensed.

Further, the second tap may be converted into a drag input started from a location corresponding to the second tap to continuously move on. At this time, the controller 180 calculates a moving distance of the drag input based on the location corresponding to the second tap, and sets an active time based on the calculated moving distance. For example, the controller 180 sets the active time as a first time when the drag input moves by a first distance, and sets the active time as a second time which is different from the first time when the drag input moves by a second distance which is different from the first distance. As a result, the user can set the active time in various ways using a convenient method.

Further, in a mobile terminal according to an embodiment of the present invention, the controller 180 can execute a screen-on function upon sensing "knockknock", and display guide information associated with the screen-on function on the display unit 151. The guide information includes information for guiding that the tap has been accurately entered or information for guiding an active time set according to the execution of the screen-on function or information for guiding that an automatic lock function is deactivated. The guide information may be displayed through at least one of visual, auditory and tactile schemes.

For example, a voice message such as "An screen-on function is performed. The active time is set to 1 minute." can be output through a speaker or a graphic image may be displayed on the display unit. In another example, when the screen-on function is executed by "knockknock" or the automatic lock function is deactivated, the controller 180 can process an edge of the display unit 151 in a highlighted manner. In other words, when an active time for maintaining the display unit in an active state is changed by "knockknock", a visual effect may be added to the edge of the display unit 151. As a result, the user may receive guide information associated with the screen-on function.

Further, the sensed pattern of a sensed tap may not match a predetermined pattern though "knockknock" while the display unit 151 is in an inactive state. In this instance, the controller 180 does not release a lock state, and maintains the display unit 151 in an inactive state. In other words, the controller 180 ignores the sensed tap. However, the controller 180 outputs a guide that there is no executable function (or the pattern of a tap has been entered in an inaccurate manner) using the light-emitting unit to guide that the tap has been applied in an inaccurate manner. For example, the light-emitting unit may blink a red illumination a plural number of times, thereby guiding that the pattern of a tap has been entered in an inaccurate manner.

Further, "knockknock" that does not correspond to the predetermined pattern may be consecutively sensed. In other words, mismatched taps may be repeated a reference number of times within a reference period of time. In this instance, the controller 180 can activate the display unit 151, and display a lock screen formed to receive a password. Repeating failure cases corresponds to when the user has misunderstood a preset tap, and thus the controller 180 displays a lock screen capable of releasing the lock on the display unit 151. Then, the user can enter a touch input to the lock screen to switch a lock state to a release state.

Further, the controller 180 can execute a screen-on function only when a preset tap is sensed within a set reference period of time from a time point at which an automatic lock function is executed. In other words, the screen-on function is executed when a preset tap is sensed within a reference period of time from a time point at which the display unit 151 is deactivated according to the execution of the automatic lock function while the screen-on function is not executed when the preset tap is sensed after the reference period of time. This provides a function for cancelling the automatic lock function in a convenient and fast manner when the automatic lock function is executed at a user's unintentional moment. Accordingly, the reference period of time may be set to a short period of time, such as two seconds, for example. Meanwhile, when the reference period of time has passed from a time point at which the automatic lock function is executed, the automatic lock function is executed by the user's intention, and thus the terminal is switched to a lock state in which an input of control command is restricted.

Further, in a mobile terminal according to an embodiment of the present invention, a user can register or edit his or her own tap for executing the screen-on function, and change the foregoing reference period of time in various ways. As a result, it is possible to provide a customized interface for the user.

According to the foregoing driving scheme, a user can tap the terminal body in which the automatic lock function is executed or an object on which the body is placed with "knockknock", thereby restoring the state prior to executing the automatic lock function. In other words, a mobile terminal according to an embodiment of the present invention provides a more intuitive and relatively simple user interface environment for the user.

Hereinafter, a method of controlling a mobile terminal according to a control method described in FIG. 4 will be described in more detail with reference to the accompanying drawings. First, a method of executing a screen-on function based on "knockknock" when an automatic lock function is executed to deactivate the display unit 151 will be described. In particular, FIGS. 5A, 5B, 5C and 5D are conceptual views for more specifically explaining a control method illustrated in FIG. 4.

Unless a user input is applied for a predetermined period of time while the display unit 151 is in an inactive state, the controller 180 executes an automatic lock function for switching the display unit 151 to an inactive state. Meanwhile, when the automatic lock function and password lock function are linked with each other, the mobile terminal will be in a lock state while at the same time executing the automatic lock function.

Furthermore, the mobile terminal according to the present invention can sense the mobile terminal body or object being hit even when the display unit 151 is in an inactive state (or off state). Thus, when the mobile terminal body or object is hit using a preset method within a preset period of time, the controller 180 can switch the display unit 151 to an active state.

At this time, the controller 180 starts time counting from a time point at which the automatic lock function is executed (or the display unit is deactivated), and determines whether or not a preset tap is applied within a reference period of time. When the reference period of time has passed, the controller 180 ignores a sensed tap. When the reference period of time has passed, the controller 180 can deactivate the sensing unit 140 or activate it with a preset period to reduce battery consumption.

Subsequently, the controller 180 can turn on the illumination of the display unit 151 in response to a preset tap being sensed. If the mobile terminal is in a lock state, the lock state may be switched to a release state, and the screen information instead of a lock screen may be displayed on the display unit 151. In other words, when switching to a release state, the most recently displayed screen can be displayed with screen information on the display unit 151 prior to executing the lock state.

Figure 5A:
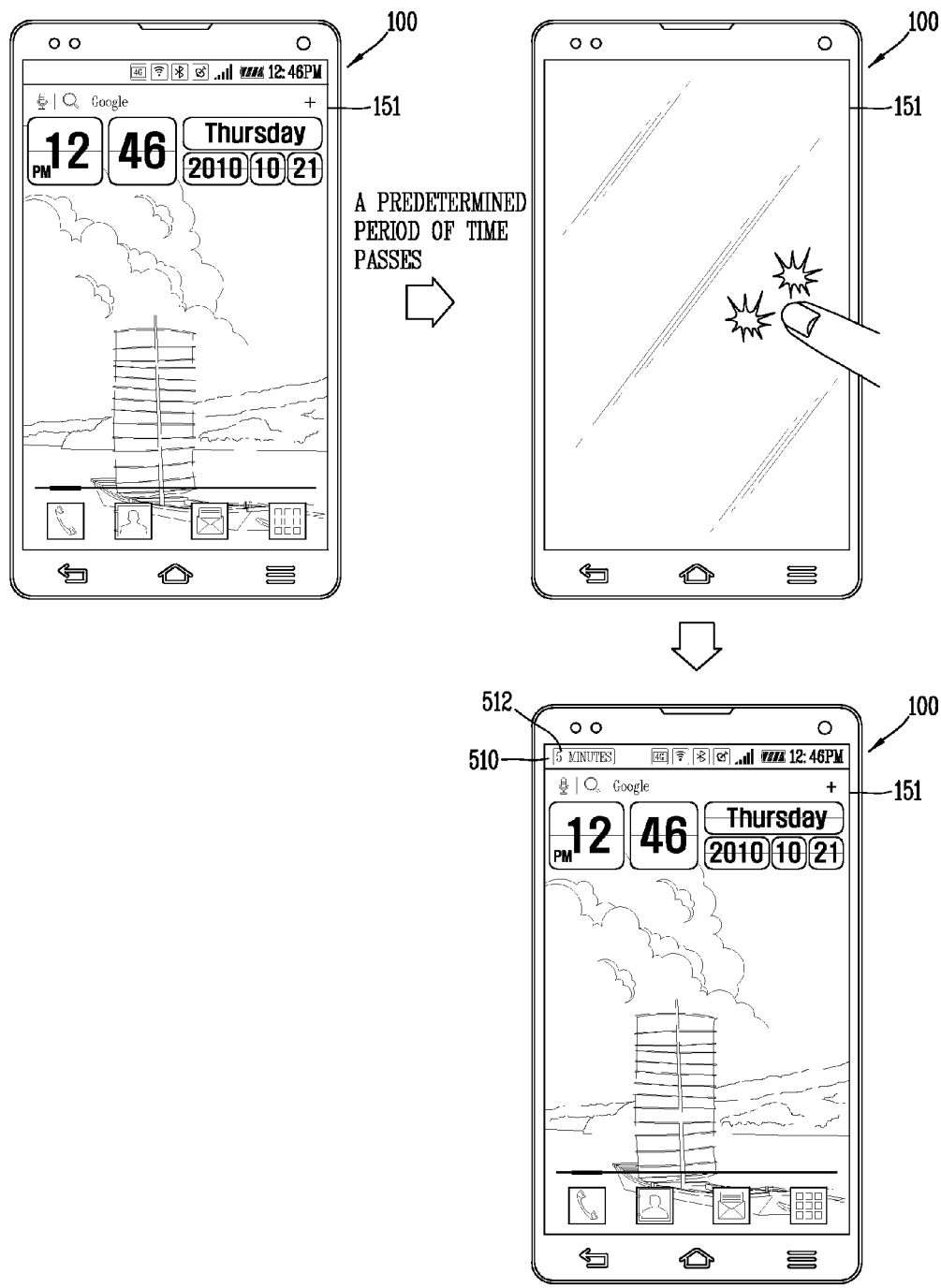

For example, unless the control command is applied to the mobile terminal for a predetermined period of time while displaying a home screen page as illustrated in FIG. 5A, the illumination of the display unit 151 is turned off (this time-out may be expressed as "the illumination of the display unit 151 is turned off" or "the automatic lock function is executed"). Then, when a tap is applied to the body 100 within a reference period of time using a preset method, screen information that has been displayed prior to turning off the illumination, namely, a home screen page, is displayed again.

Further, according to an embodiment of the present invention, the controller 180 sets an active time associated with the second active state in response to a user input sensed when the display unit 151 is in an inactive state. Furthermore, unless a user input is applied for the set active time after the display unit 151 is switched to the second active state, the controller 180 deactivates the display unit 151.

The active time may set in various ways according to the sensed user input. For example, a first active time will be set upon sensing a first user input, and a second active time which is different from the first active time will be set upon sensing a second active time which is different from the first active time.

When an active time is set, the controller 180 can display information associated with the active time set in a partial region of the display unit 151. The information associated with the active time may include at least one of a set active time and a remaining time remained until the automatic lock function is executed. The remaining time may be counted in the unit of minutes or seconds, and the counting of the remaining time may be visually displayed on the display unit 151.

For example, as illustrated in FIG. 5A, information 512 associated with an active time may be displayed on the status information region (or indicator 510) in which the status information of the mobile terminal 100 is displayed. The user can check information associated with an active time, thereby checking a remaining time until the automatic lock function is executed.

Further, when a control command is applied from the user, the controller 180 can reset the remaining time, and start counting again from a time point at which the control command is applied from the user. For example, when the set active time is 5 minutes and a touch is sensed at a time point of the remaining time of 2 minutes, the controller 180 can reset the remaining time, and start counting again 5 minutes from a time point at which the touch is released.

In addition, when a touch to information associated with the active time is sensed, the controller 180 can execute an application associated with the automatic lock function. The user may activate or deactivate the automatic lock function or reset the active time using the execution screen of the application.

Figure 5B:
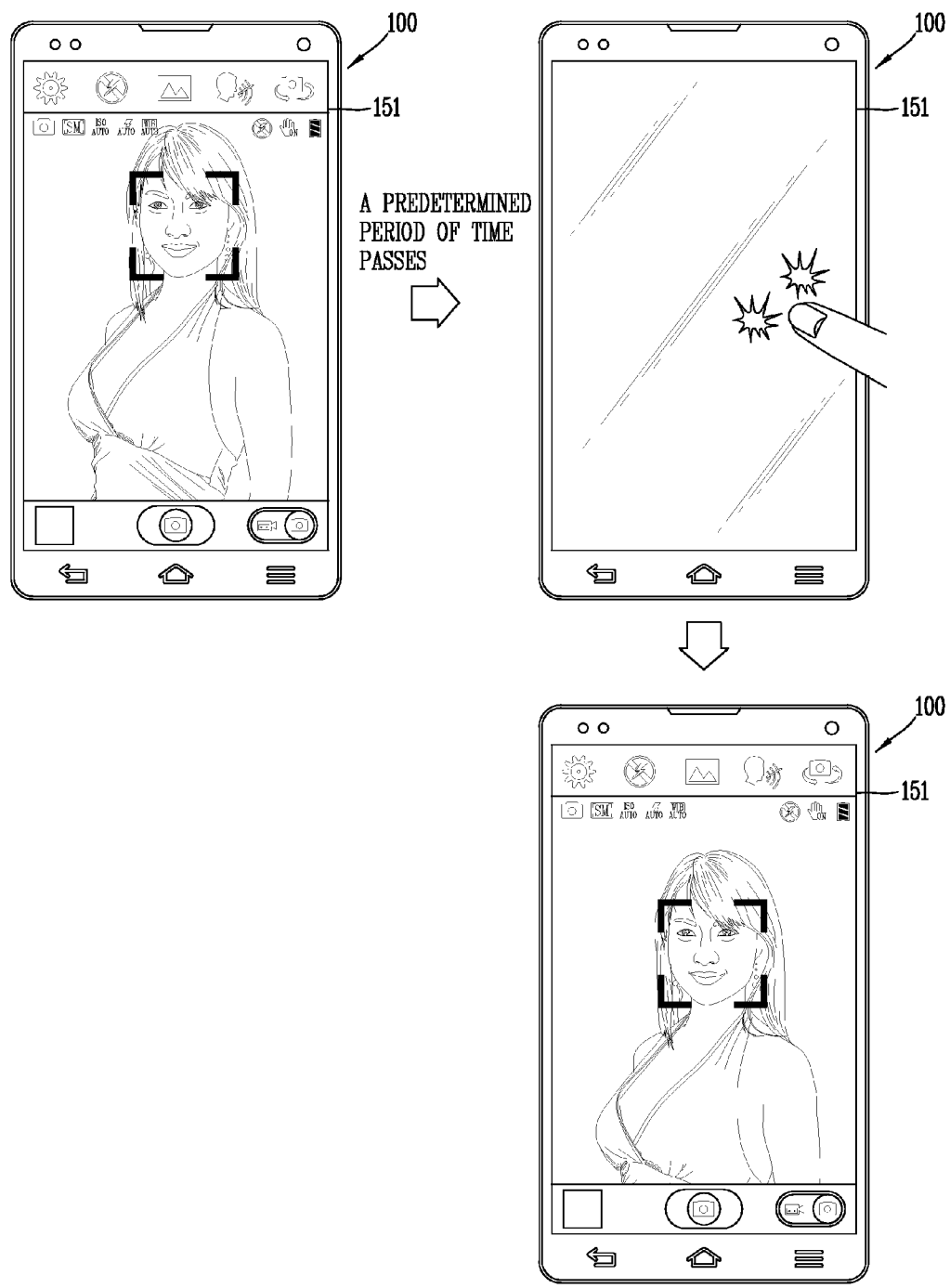

Further, when an automatic lock function is executed while executing any function (for example, a camera application) as illustrated in FIG. 5B, the display unit 151 can be deactivated. Meanwhile, when a preset tap is sensed within a reference period of time, the execution screen corresponding to the function at the time of executing the screen-on function is displayed again. In other words, the controller 180 can activate the any function (for example, camera capture function) in a similar manner. At this time, an image captured in the camera may vary according to a change of the location of the body.

In addition, as illustrated in FIG. 5C, a home screen page may be displayed on the display unit 151 when the mobile terminal is placed on a desk. Furthermore, unless a control command is received for a predetermined period of time, the automatic lock function may be executed to deactivate the display unit 151. At this time, a tap applied to an object in contact with the body matches a preset tap, the controller 180 can execute an screen-on function, and display the home screen page again.

Figure 5D:
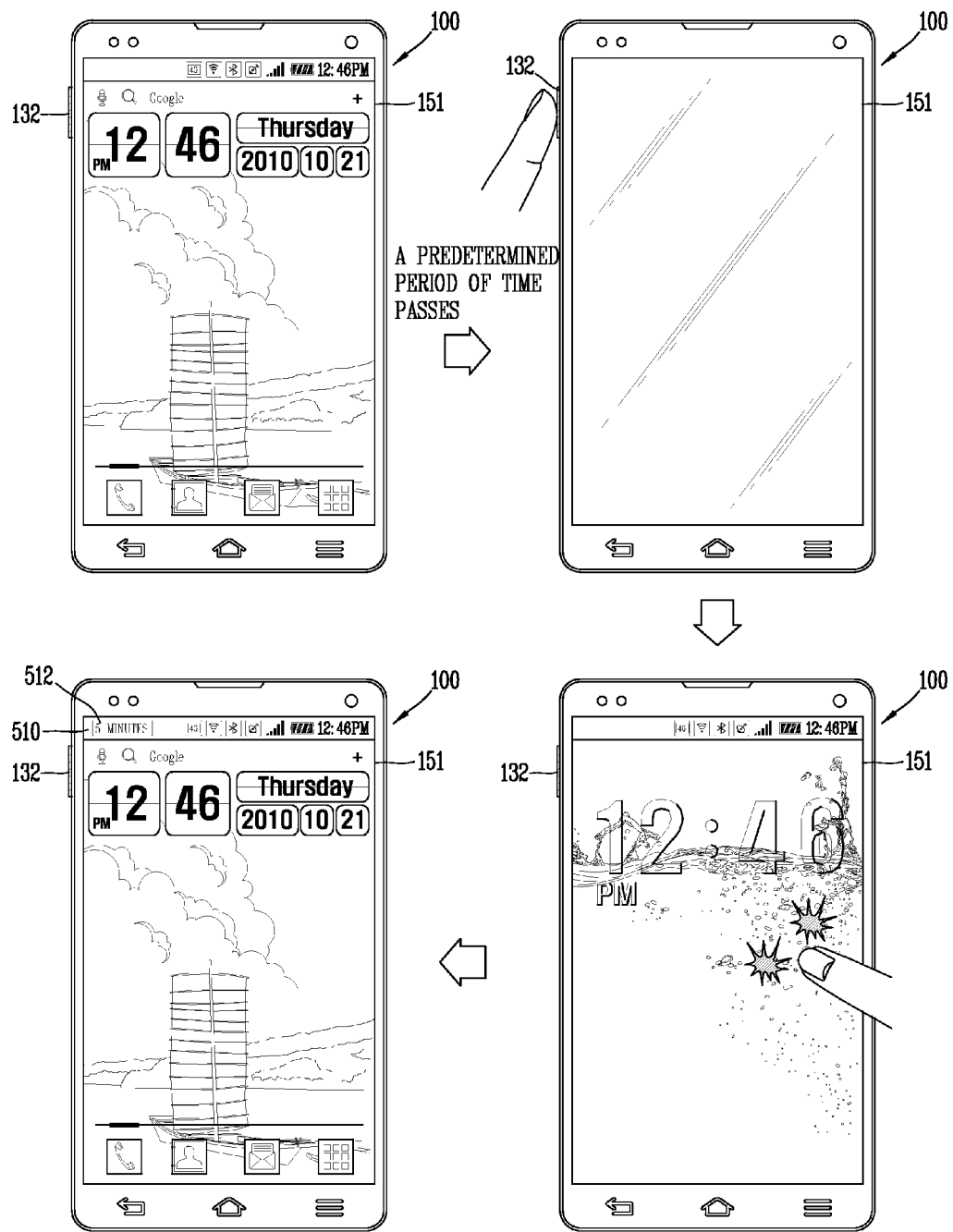

Further, the screen-on function can be executed in an active state as well as in an inactive state. For example, as illustrated in FIG. 5D, the automatic lock function is executed to deactivate the display unit 151. Then, when the signal input unit 132 formed to turn on or off the display unit 151 is pressed, the controller 180 activates the display unit 151, and displays a lock screen on the display unit 151. Subsequently, a user input corresponding to a preset condition may be applied when the lock screen is displayed. When the user input is applied within a reference period of time from a time point at which the automatic lock function is executed, the controller 180 displays screen information that has been displayed prior to executing the automatic lock function on the display unit 151 in response to the user input.

As described above, a mobile terminal according to an embodiment of the present invention can restore the mobile terminal to a state prior to executing the automatic lock function using a simple method of tapping the terminal or object. Thus, the controller 180 can provide a more friendly user experience (UX) for the user.

Figure 6A:
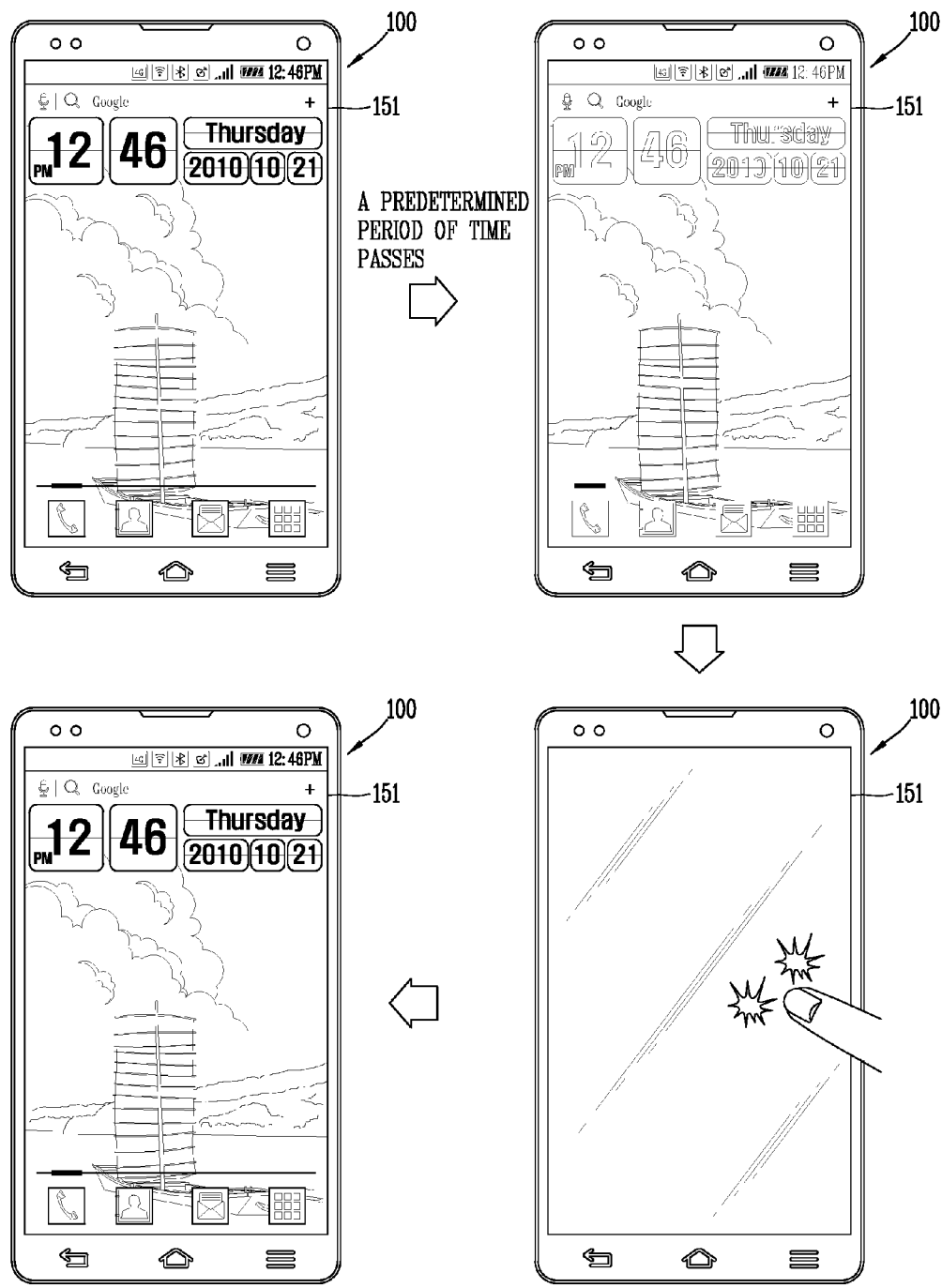

Next, FIGS. 6A and 6B are conceptual views illustrating a method of cancelling an automatic lock function based on a tap while executing the automatic lock function in a mobile terminal according to an embodiment of the present invention. Referring to FIG. 6A, when the automatic lock function is executed, the controller 180 can gradually deactivate the display unit 151 in an active state. In other words, the controller 180 can gradually adjust the brightness of illumination provided therein to illuminate the display unit, and then finally completely turn off the illumination. Thus, the user is guided or informed that the automatic lock function is expected.

In addition, the controller 180 can execute a screen-on function when a tap corresponding to a preset condition is sensed when the automatic lock function is executed as illustrated in FIG. 6A as well as when the automatic lock function is being executed or the brightness of screen information is gradually dimmed as illustrated in FIG. 6B. The controller 180 can also dim the brightness of the illumination for a set amount of time and then turn off the illumination. The set amount of time can be the predetermined time the "knockknock" can be sensed to disable the automatic lock function or to reconfigure the predetermined time period, which is an execution condition of the automatic lock function.

Hereinafter, for the sake of convenience of explanation, embodiments of the present invention will be described in detail on the assumption that "knockknock" is sensed when the display unit 151 is in an inactive state. Embodiments disclosed below may be also applicable to when a "knockknock" is sensed while the display unit 151 is being switched from an active state to an inactive state.

Further, the controller 180 displays screen information that has been displayed prior to executing the automatic lock function on the display unit 151 when the screen-on function is executed. In addition, the controller 180 can display a recent apps list or favorite apps list in at least partial region of the display unit 151. The apps list may include at least one shortcut icon, and at least one of the type and sequence of shortcut icons contained in the apps list may be changed according to the set condition. Meanwhile, the shortcut icon is formed to execute an application set to the shortcut icon in response to a touch to the shortcut icon.

Figure 7A:
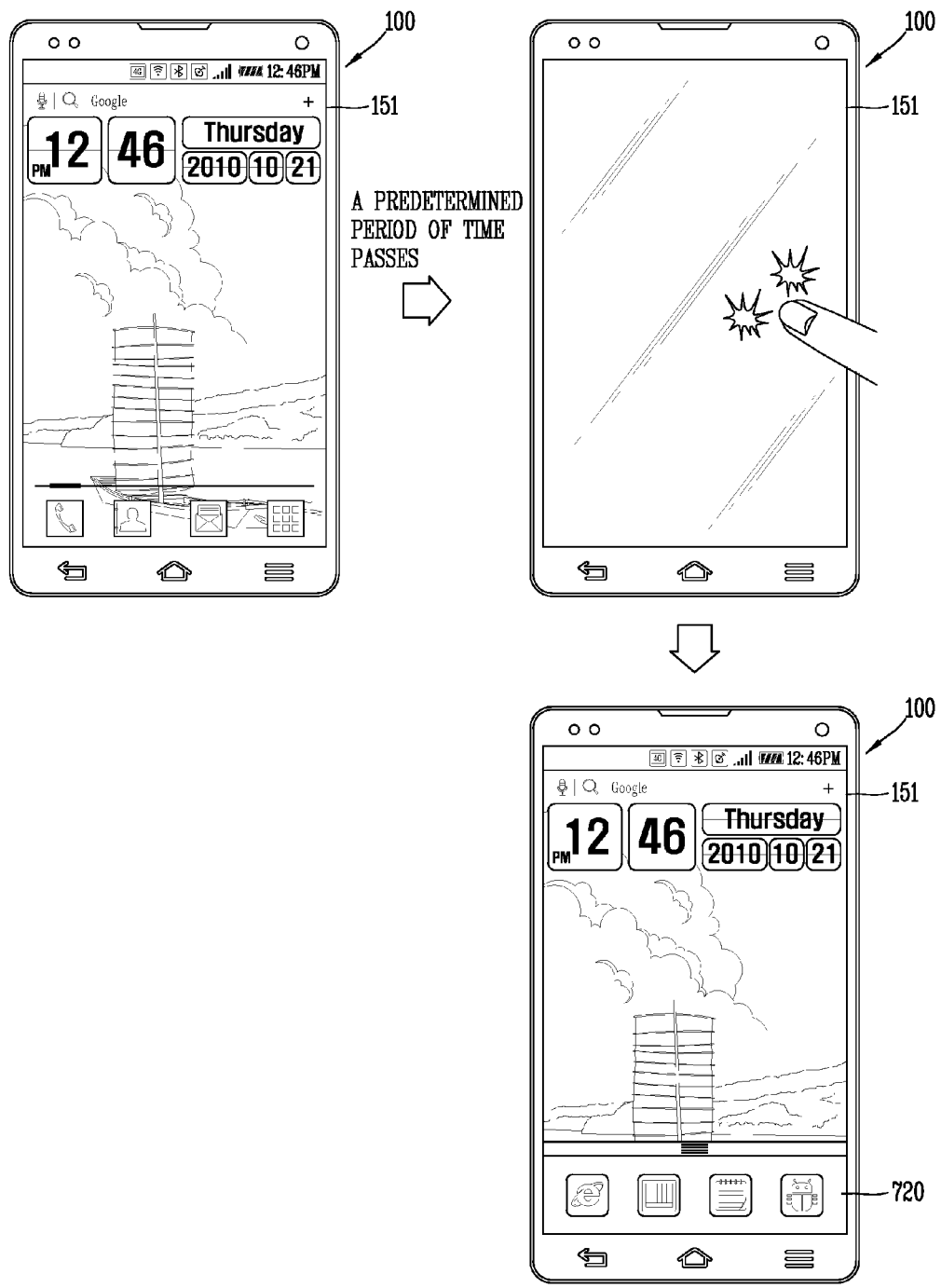

For example, referring to FIGS. 7A and 7B, while an execution screen according to the execution of a camera application is displayed as screen information, an automatic lock function is executed to switch the display unit 151 to an inactive state. Then, when a tap corresponding to a preset condition is sensed, the controller 180 executes a screen-on function, and redisplays screen information that has been displayed prior to executing the automatic lock function on the display unit 151.

Further, the controller 180 can display a recent apps list in a partial region 710 of the display unit 151. The type of shortcut icons contained in the recent apps list or favorite apps list varies according to the type of the recently executed application. Furthermore, the recent apps list may disappear from the display unit 151 when a predetermined period of time has passed or by a gesture of closing a window corresponding to the partial region 720 or pulling down the window to a boundary of the display unit 151, and the like. As a result, the user can quickly execute a specific application using an apps list displayed on the display unit 151 without pressing a home button or the like. FIG. 7A illustrates a home screen being displayed first and FIG. 7B illustrates a camera function being executed before the screen is deactivated. The icons displayed in the partial region can also be different as illustrated in FIGS. 7A and 7B. For example, FIG. 7A illustrates recently used applications in the partial region 720 and FIG. 7B illustrates applications related to the camera application.

Hereinafter, a method of differently setting a setting value associated with the active state by any one of a plurality of preset taps to execute an screen-on function will be described in detail. In particular, FIGS. 8A, 8B, 8C, 9A and 9B are conceptual views illustrating a method of differently setting a setting value associated with an active state according to the characteristics of a tap in a mobile terminal according to an embodiment of the present invention.

The controller 180 can sense the mobile terminal body or body being bit even when the display unit 151 is in an inactive state. As described above, when a tap corresponding to a preset condition is sensed within a reference period of time while the display unit 151 is in an inactive state, the controller 180 can execute a screen-on function.

The controller 180 can set an active time associated with the active state while at the same time executing the screen-on function. The active time denotes a time for which the display unit 151 maintains an active state. Unless a control command is applied for the active time from a user, the display unit 151 is switched back to an inactive state.

Further, there may be various active times, and the controller 180 can set a different active time according to which one of the plurality of taps stored in the memory 160. In other words, the active time may vary according to an attribute of the sensed tap. More specifically, the controller 180 can set a different active time according to a number of times of the sensed taps, an intensity of the sensed tap, a number of the sensed tap objects, and the like.

Figure 8A:
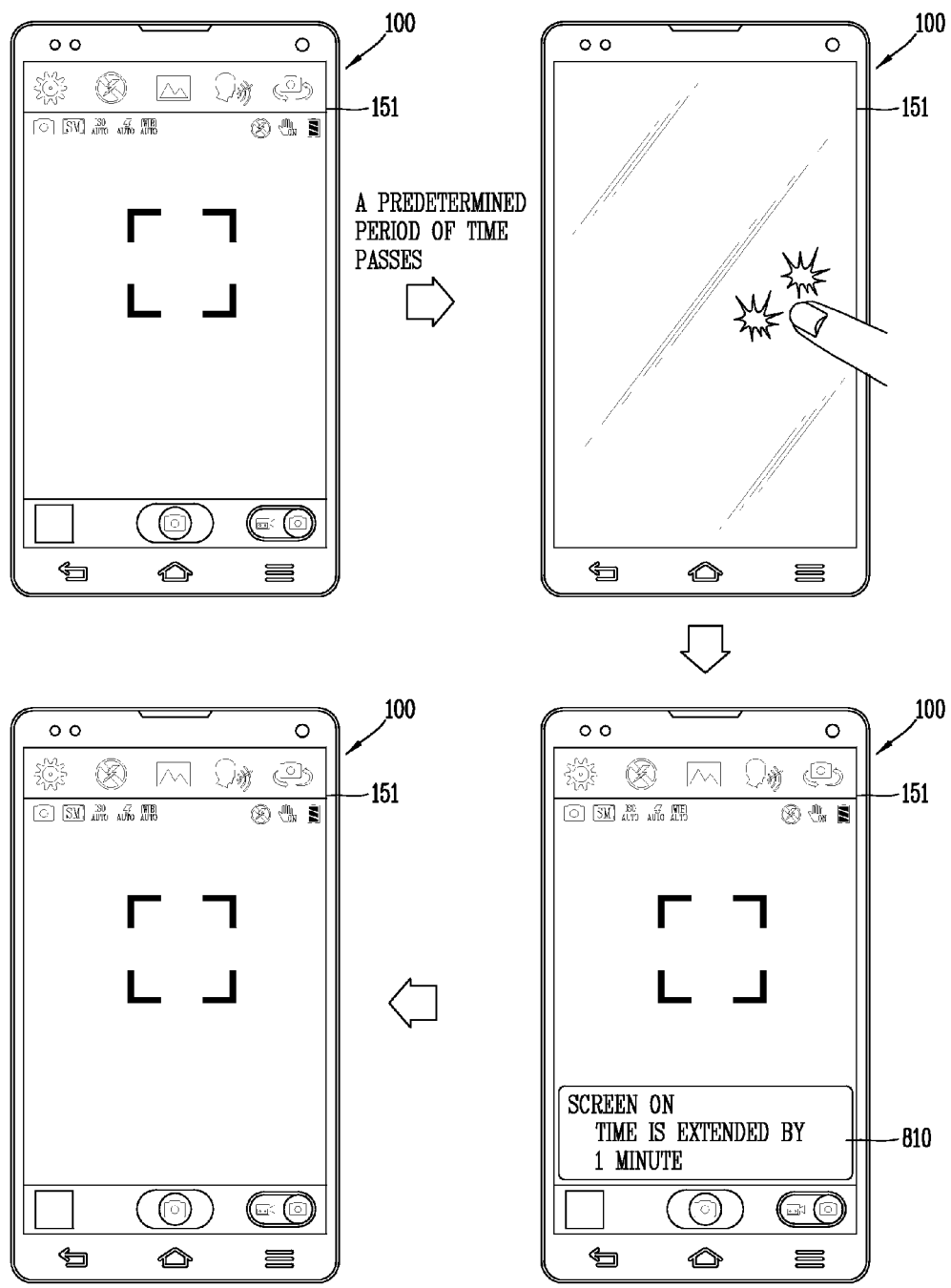
FIGS. 8A, 8B, 8C, 9A and 9B are conceptual views illustrating a method of differently setting a setting value associated with an active state according to the characteristics of a tap in a mobile terminal according to an embodiment of the present invention.
Figure 8B:
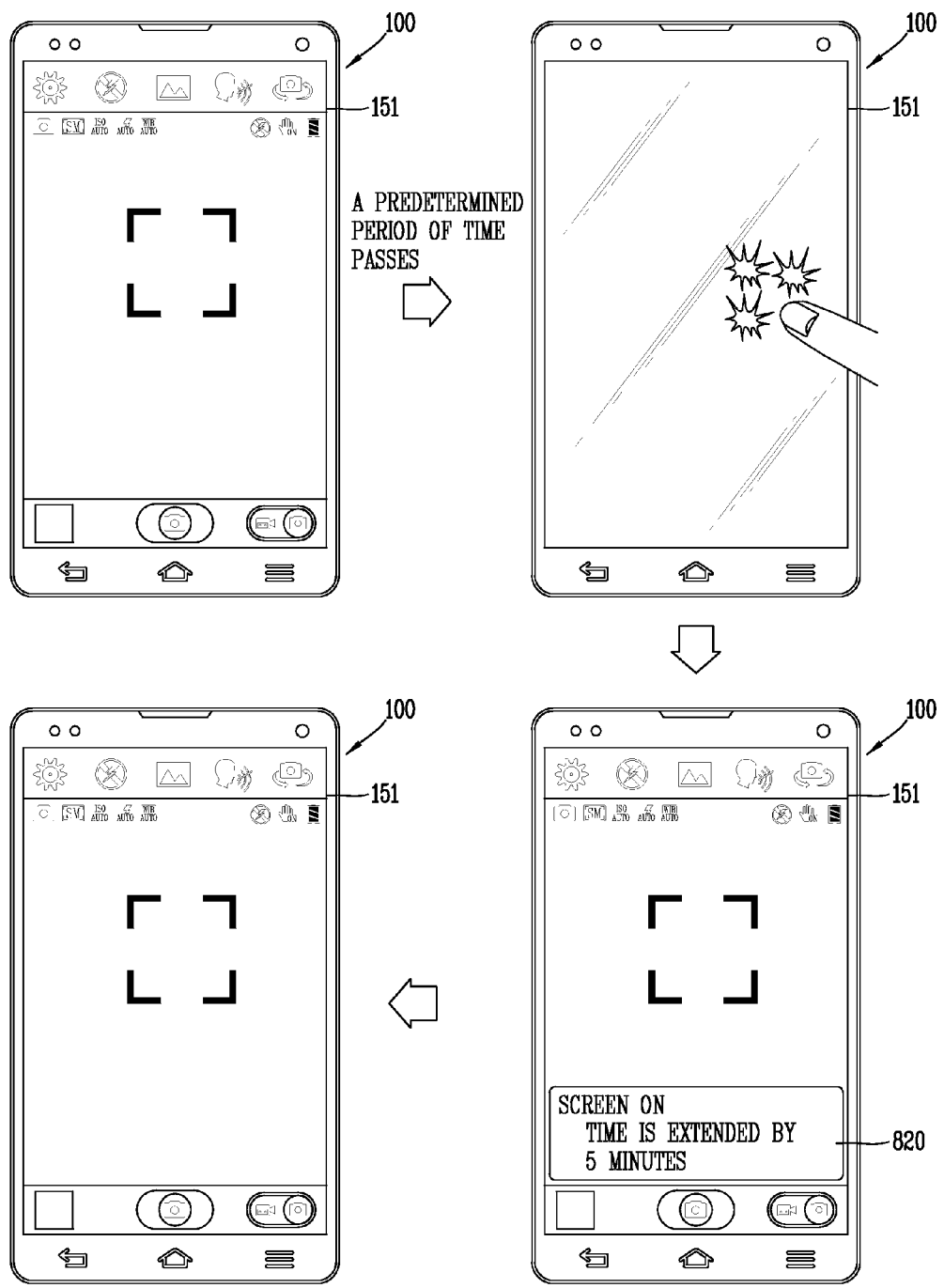

For example, the controller 180 can set the active time to be larger as increasing the number of the sensed taps. The active time may be set to 1 minute when "knockknock" hitting twice consecutively is sensed as illustrated in FIG. 8A, and the active time may be set to 5 minutes when "knockknock" hitting three times consecutively is sensed as illustrated in FIG. 8B.

Figure 9A:
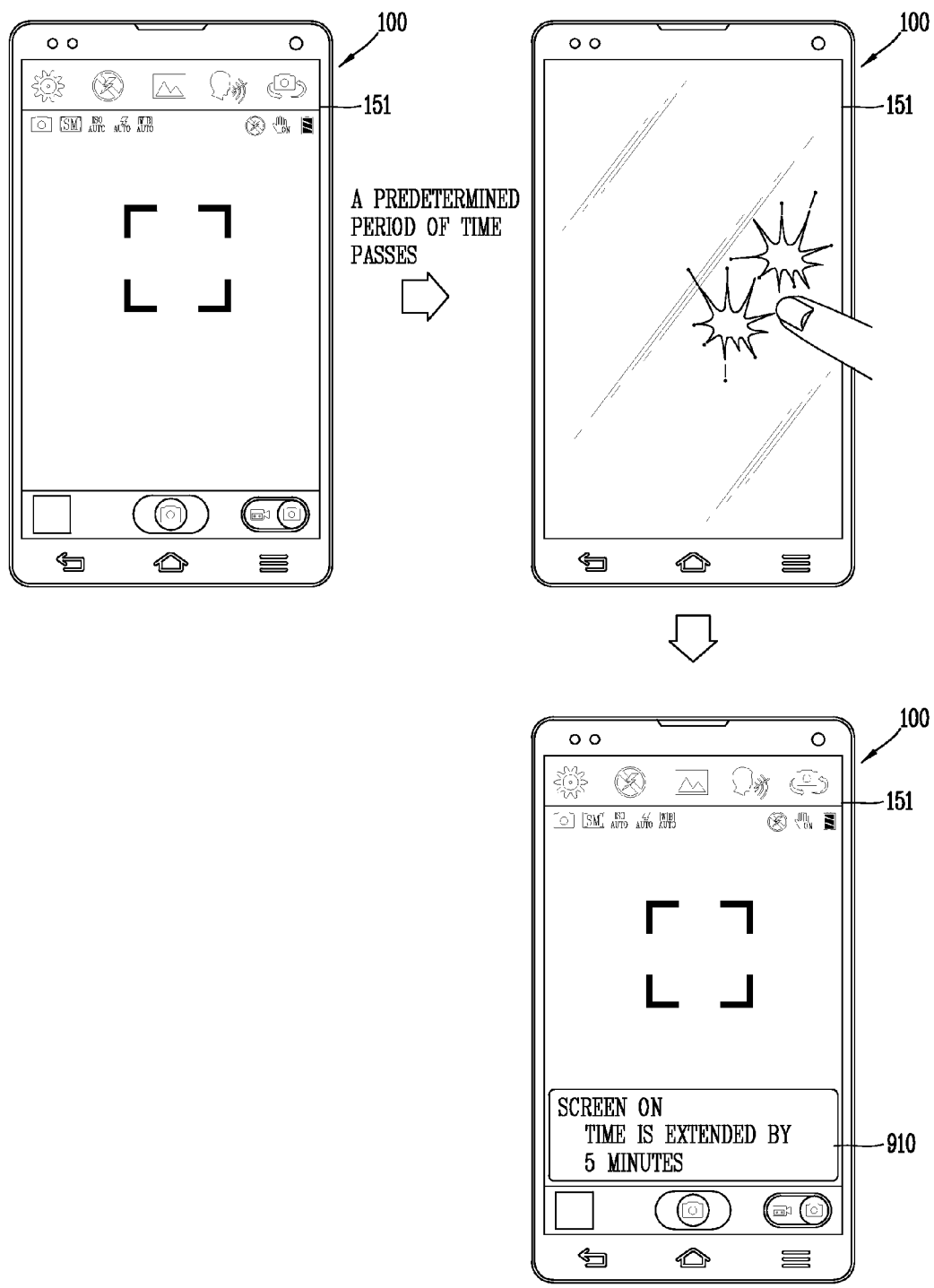
Figure 9B:
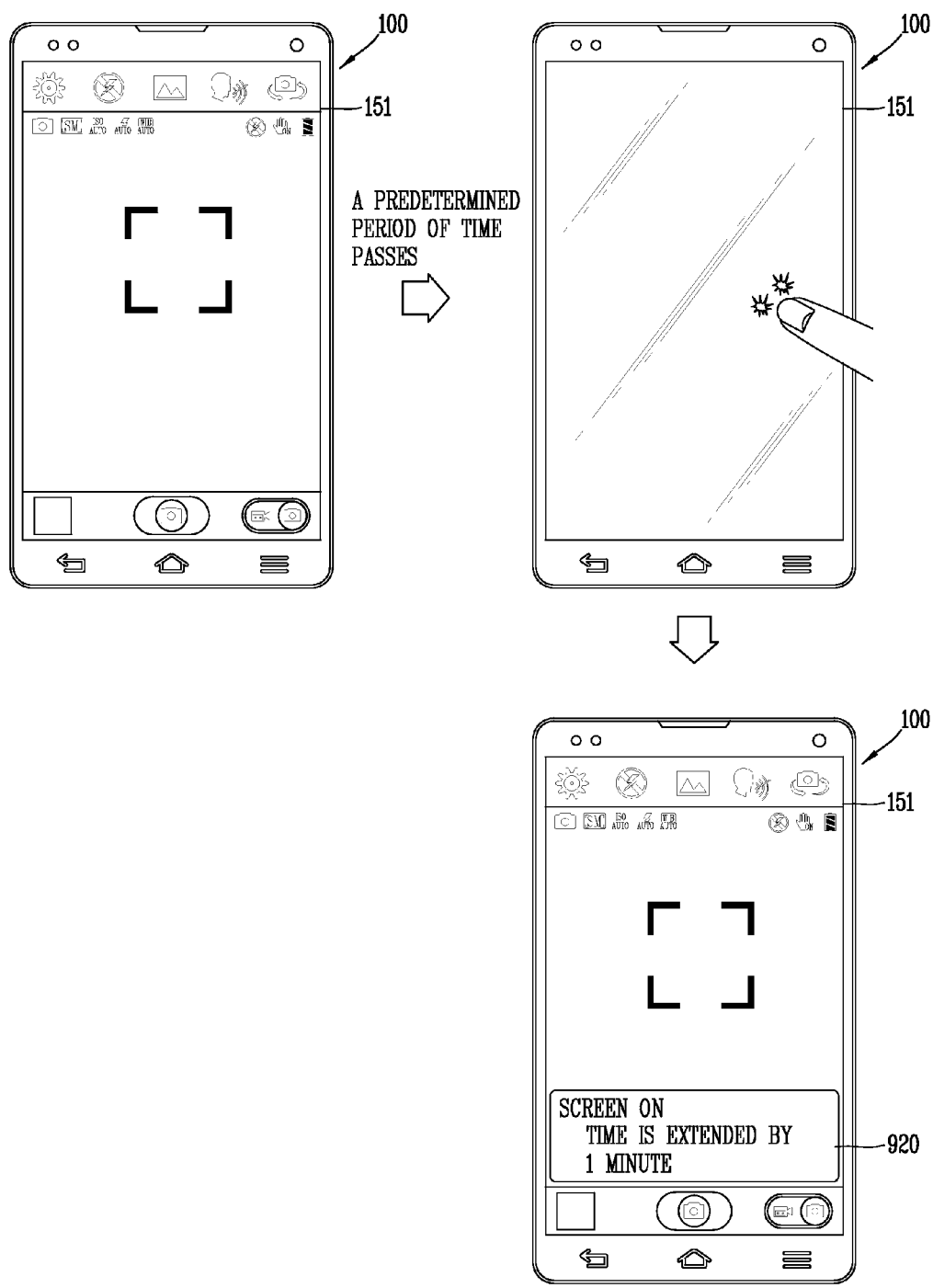

In another example, the controller 180 can set the active time to be larger as increasing an intensity of the sensed tap. The active time may be set to 5 minutes when "knockknock" hitting with a first intensity is sensed as illustrated in FIG. 9A, and the active time may be set to 1 minute when "knockknock" hitting with a second intensity which is relatively smaller than the first intensity is sensed as illustrated in FIG. 9B.

In addition, the controller 180 can display guide information on an active time set according to the execution of the screen-on function. The guide information may be output through any one of visual, auditory and tactile schemes. It can be deduced that the user strongly wants the cancellation of an automatic lock function when hitting the terminal at higher frequency or intensity. As a result, it is possible to provide a more intuitive user interface environment for the user.

Figure 8C:
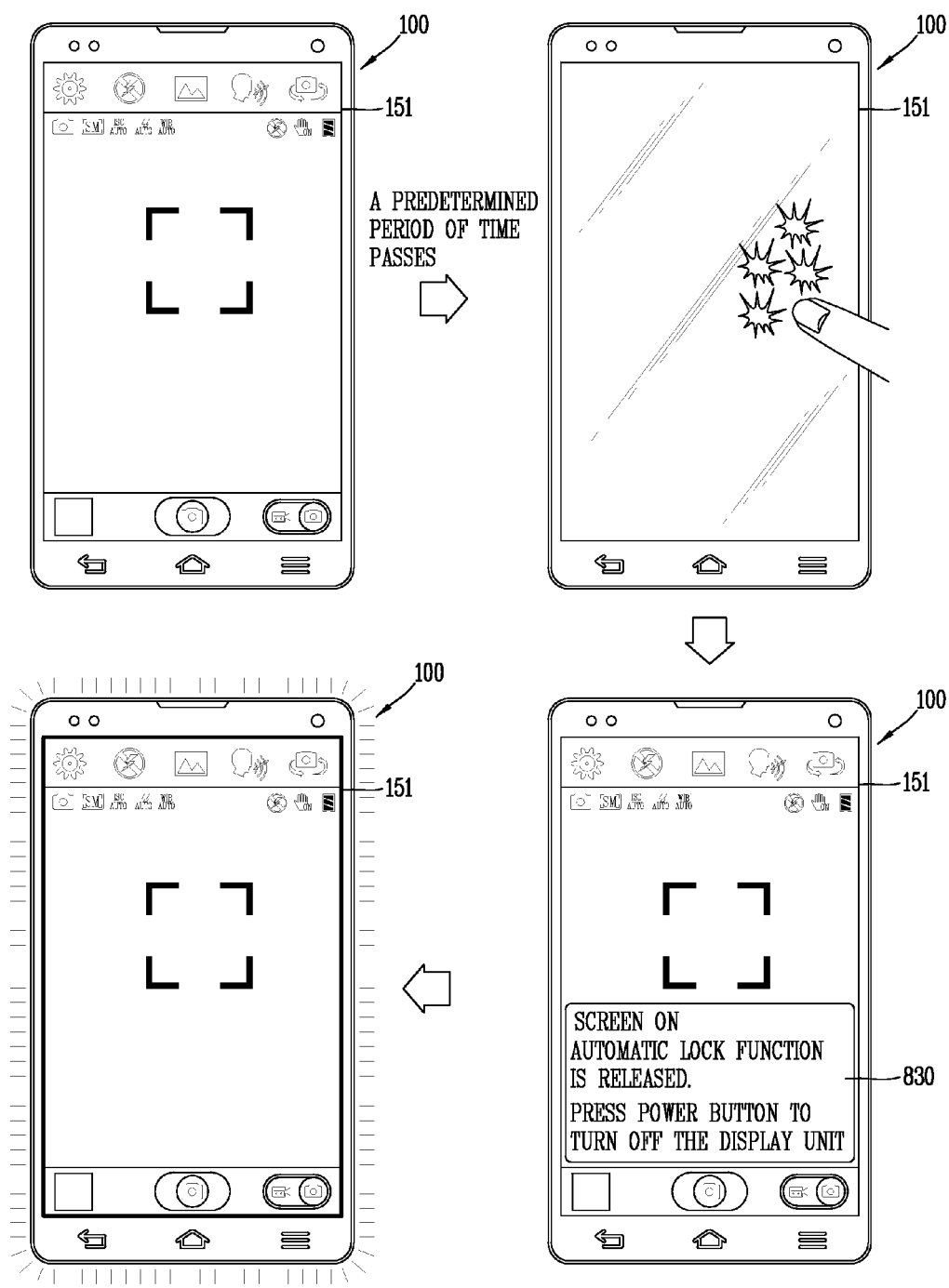

Further, as shown in FIG. 8C, the controller 180 can execute a screen-on function but deactivate an automatic lock function when the number of times of the sensed taps is greater than a preset number of times. In other words, the controller 180 executes a screen-on function in response to the sensed tap, but maintains the 151 as an active state until a user input is applied to the button portion formed to turn on or off the display unit 151. For example, when the automatic lock function is deactivated, the display unit 151 will be deactivated only when the power button is pressed by a user. As a result, the user can deactivate the display unit 151 at a user's desired moment.

Furthermore, as illustrated in FIG. 8C, when the automatic lock function is deactivated, the controller 180 can process an edge of the display unit 151 in a highlighted manner. For example, it is possible to add a visual effect such as blinking processing, intensity processing, color change processing or the like to the edge of the display unit 151. The highlight processing may be also applicable when the active time of the display unit 151 is changed by "knockknock" as well as when the automatic lock function is deactivated.

Figure 10A:
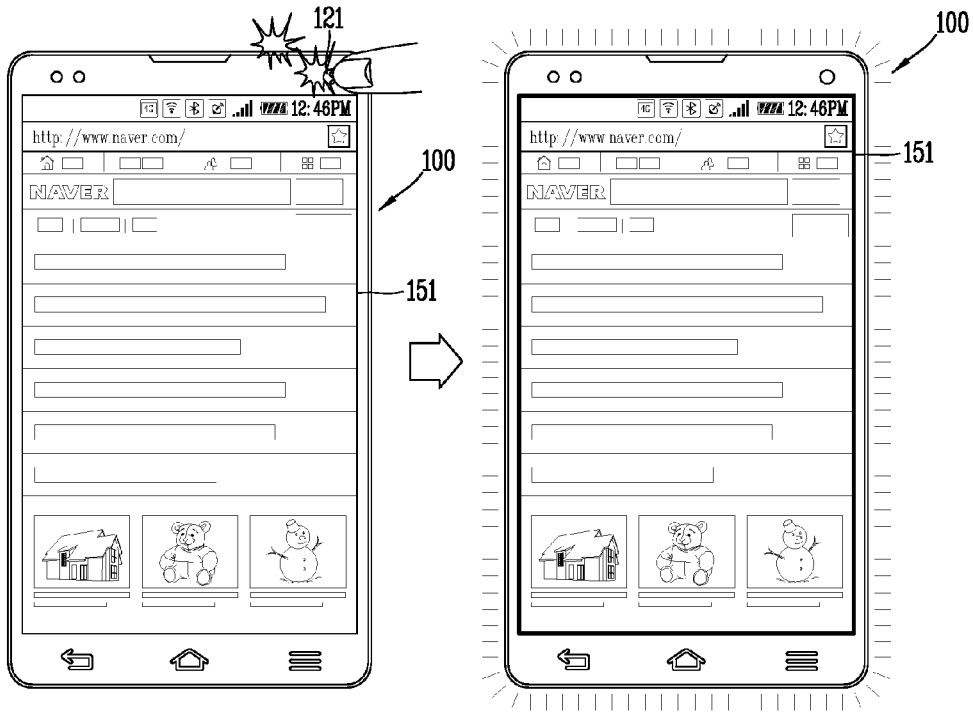
Figure 10B:
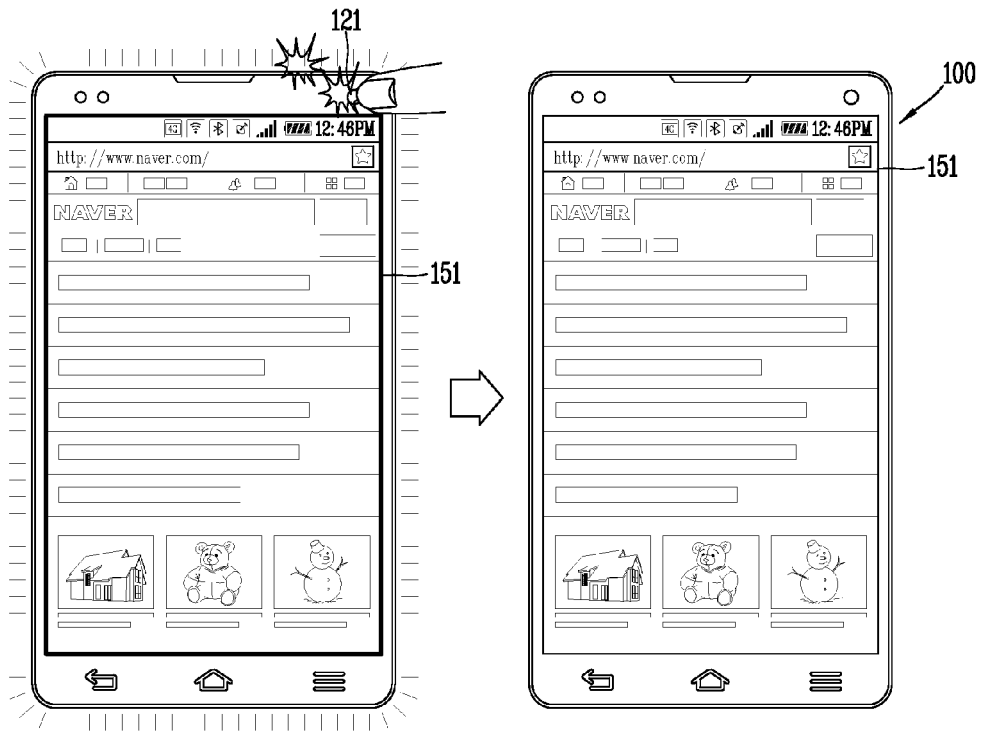

Thus, the controller 180 can set a different active time according to the characteristic of a different "knockknock". The characteristic of different "knockknock" may be a characteristic that is typically intuitive by a user, and through this, the controller 180 can provided a more friendly user experience (UX) for the user Next, FIGS. 10A, 10B and 10C are conceptual views illustrating a method of differently setting a setting value associated with an active state when a tap is sensed at a specific location in a mobile terminal according to an embodiment of the present invention. The controller 180 can change a setting value associated with the active state in response to "knockknock" sensed at a specific location of the body. When "knockknock" is applied to a specific location of the mobile terminal when the display unit is in an active state, the controller 180 can change the active time of the display unit 151. Moreover, the controller 180 can deactivate or activate the automatic lock function.

For example, when a preset tap is sensed at a location disposed with the front camera 121 while the display unit 151 is activated to display screen information as illustrated in FIG. 10A, the controller 180 can deactivate the automatic lock function. In this instance, the controller 180 can process an edge of the display unit 151 in a highlighted manner to notify the deactivation of the automatic lock function. For example, it is possible to add a visual effect such as blinking processing, intensity processing, color change processing or the like to the edge of the display unit 151.

Furthermore, as illustrated in FIG. 10B, when a preset tap is sensed at a location disposed with the front camera 121 while the automatic lock function is in an inactive state, the controller 180 can activate the automatic lock function. In addition, as illustrated in FIG. 10C, when a preset tap is sensed at a location disposed with the front camera 121 while the display unit 151 is in an inactive state, the controller 180 can display a recent apps list on the display unit 151. Next, any one of shortcut icons contained in the recent apps list may be selected. In addition, the controller 180 can deactivate the automatic lock function and execute an application corresponding to the selected shortcut icon.

Further, the sensed plurality of taps hitting the display unit 151 does not form a pattern that matches an operation pattern for lock release. Hereinafter, a control method associated with a wrong tap is applied will be described in detail.

Figure 11B:
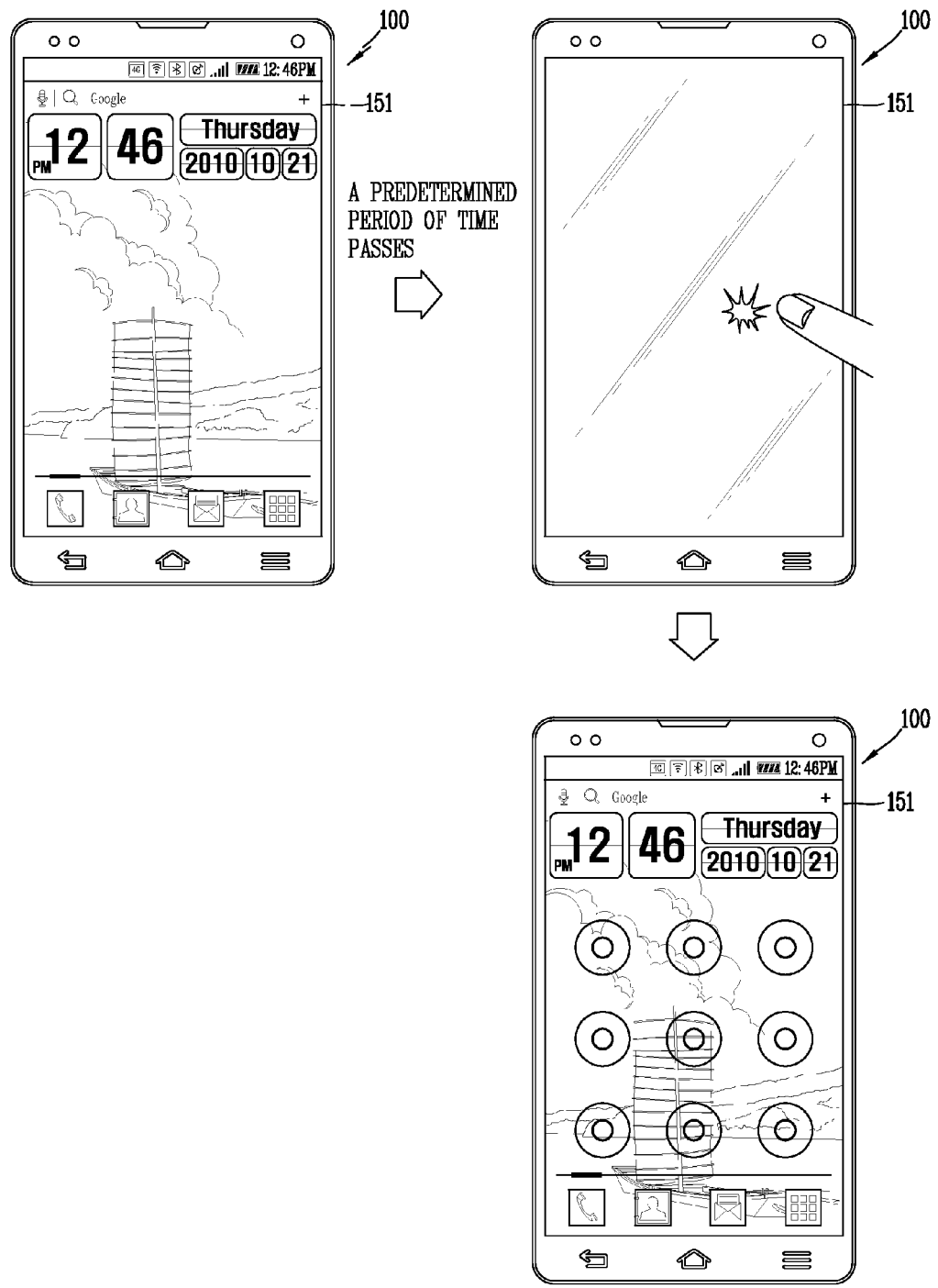

In particular, FIGS. 11A and 11B are conceptual views illustrating screen information displayed on the display unit when a wrong tap is applied in a mobile terminal according to an embodiment of the present invention. Taps (or a tap that does not match a preset condition) which are not related to a screen-on function may be sensed on the mobile terminal. In this instance, the controller 180 does not execute a screen-on function, and maintains the display unit 151 in an inactive state.

In other words, the controller 180 ignores the sensed tap. However, the controller 180 outputs a guide that there is no executable function (or the pattern of a tap has been entered in an inaccurate manner) using the light-emitting unit disposed on a front surface of the body to guide that the tap has been applied in an inaccurate manner for the user. For example, the light-emitting unit can blink a red light a plural number of times, thereby guiding that the pattern of a tap has been entered in an inaccurate manner.

Further, "knockknock" that does not correspond to the predetermined pattern may be consecutively sensed. In other words, taps unrelated to the screen-on function may be repeatedly sensed a reference number of times within a reference period of time. In this instance, the controller 180 can activate the display unit 151, and display a lock screen. Repeating failure cases corresponds to when the user has misunderstood a preset tap, and thus the controller 180 displays a lock screen capable of releasing the lock on the display unit 151. Then, the user can apply a touch input to the lock screen to switch a lock state to a release state. When the automatic lock function is linked with a password lock function, as illustrated in FIG. 11A, the lock screen may include a virtual keypad formed to receive a password.

Further, when taps mismatched to a preset condition are consecutively sensed, the controller 180 can display a lock screen, and display screen information just prior to executing the automatic lock function as a background image of the lock screen. For example, as illustrated in FIG. 11B, an automatic lock function may be executed while displaying a home screen page. Then, when taps mismatched to a preset condition are consecutively sensed, the controller 180 can display a home screen page as a background image of the lock screen as illustrated in FIG. 11B. At this time, the background image is just an image, and thus an application due to the relevant icon is not executed even though a touch is applied to a location displayed with the icon.

In addition, the controller 180 can display a graphic object for setting the active time on the display unit 151 as well as execute an screen-on function in response to a preset user input. Hereinafter, a method of setting an active time period for maintaining the display unit in an active state in a mobile terminal according to an embodiment of the present invention will be described in detail with reference to FIGS. 12A, 12B and 12C.

The controller 190 can execute a screen-on function when a preset user input is applied within a reference period of time from a time point at which the automatic lock function is executed. For example, when a user input consecutively hitting the body twice is applied or a user's long touch input for maintaining a touch for a preset period of time is applied, a screen-on function may be executed.

Figure 12A:
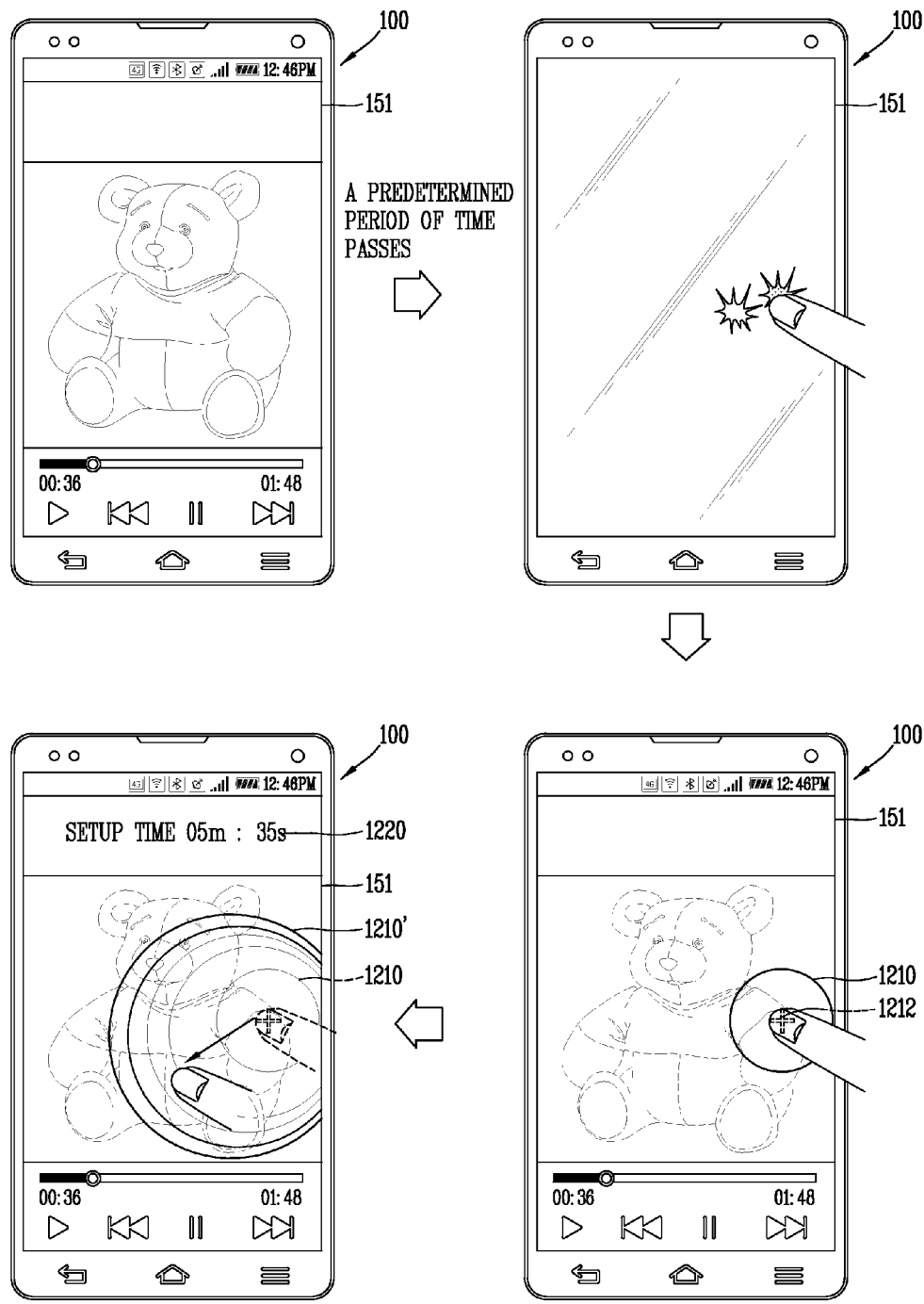
FIGS. 12A, 12B and 12C are conceptual views illustrating a method of setting an active time period for maintaining the display unit in an active state in a mobile terminal according to an embodiment of the present invention.

Further, when the last tap/touch contained in a preset user input maintains a contact without being released from the state of being in contact with the terminal (it is referred to as "hold"), the controller 180 can display a graphic object formed to set an active state at a location corresponding to the last tap/touch. For example, as illustrated in FIG. 12A, when the last tap is held, the controller 180 can execute a screen-on function, and display a circular-shaped graphic object 1210 around a location at which the last tap/touch is sensed. Hereinafter, for the sake of convenience of explanation, the center point is referred to as a "first location", and a cross-shaped identifier 1212 indicating the first location is illustrated on the drawing.

Subsequently, as illustrated in FIG. 12A, the last tap/touch may be switched to a drag input consecutively moving from a first location to a second location. In other words, the touch may move from the first location to the second location without being released. As the touch moves without being released, the controller 180 can change a size of the graphic object displayed on the display unit 151 based on a moving direction and distance (1210→1210').

Further, the controller 180 calculates an active time corresponding to a distance between the first location and the second location. For example, the controller 180 can calculate a first active time corresponding to a first distance when the drag input moves by the first distance, and calculate a second active time which is longer than the first active time when moving by a second distance which is greater than the first distance.

The controller 180 can display information 1220 on the calculated active time on the display unit 151. The user may check an active time to be set using the active time 1220 displayed on the display unit 151, and apply a drag input to set his or her desired active time. Also, the size of the graphic object can be modified according to the drag input (1210→1210'), thereby providing an intuitive interface for the user.

Subsequently, when a touch switched to a drag input is released at any location, the controller 180 can set an active time based on a distance between the first position and the any location. Further, the active time may be set between the minimum time and the maximum time. For example, the minimum time may be set to 3 seconds and the maximum time to 15 minutes. When a distance between the first location and the any location at which the touch is released is shorter than a distance corresponding to the minimum time, the controller 180 can execute an automatic lock function or display the graphic object again or set the active time as a default time.

Figure 12B:
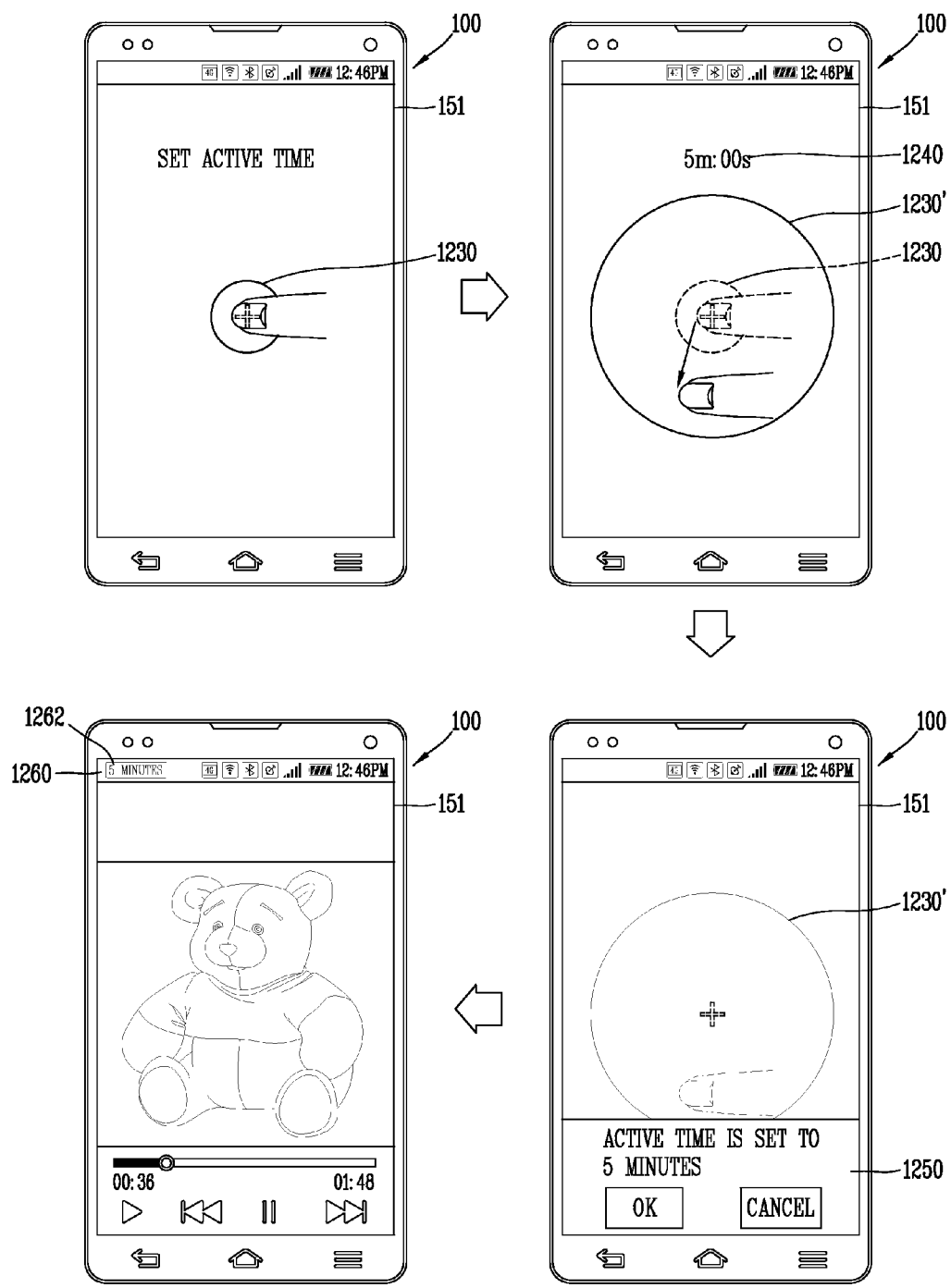

For example, referring to FIG. 12B, the controller 180 can display a related graphic object 1230 formed to set an active time in response to a preset user input. Then, the size of the graphic object may be changed by a drag input (1230→1230'), and information 1240 associated with the active time corresponding to a moving distance may be displayed. Then, when the touch is released, the active time is set based on the released location, and screen information that has been displayed prior to executing the automatic lock function is displayed on the display unit 151.

Further, the controller 180 can display information 1260 associated with an active time which is set in a partial region of the display unit 151. The information 1260 associated with the active time may include at least one of a set active time and a remaining time remained until the automatic lock function is executed. The remaining time may be counted in the unit of minutes or seconds, and the counting of the remaining time may be visually displayed on the display unit 151.

Figure 12C:
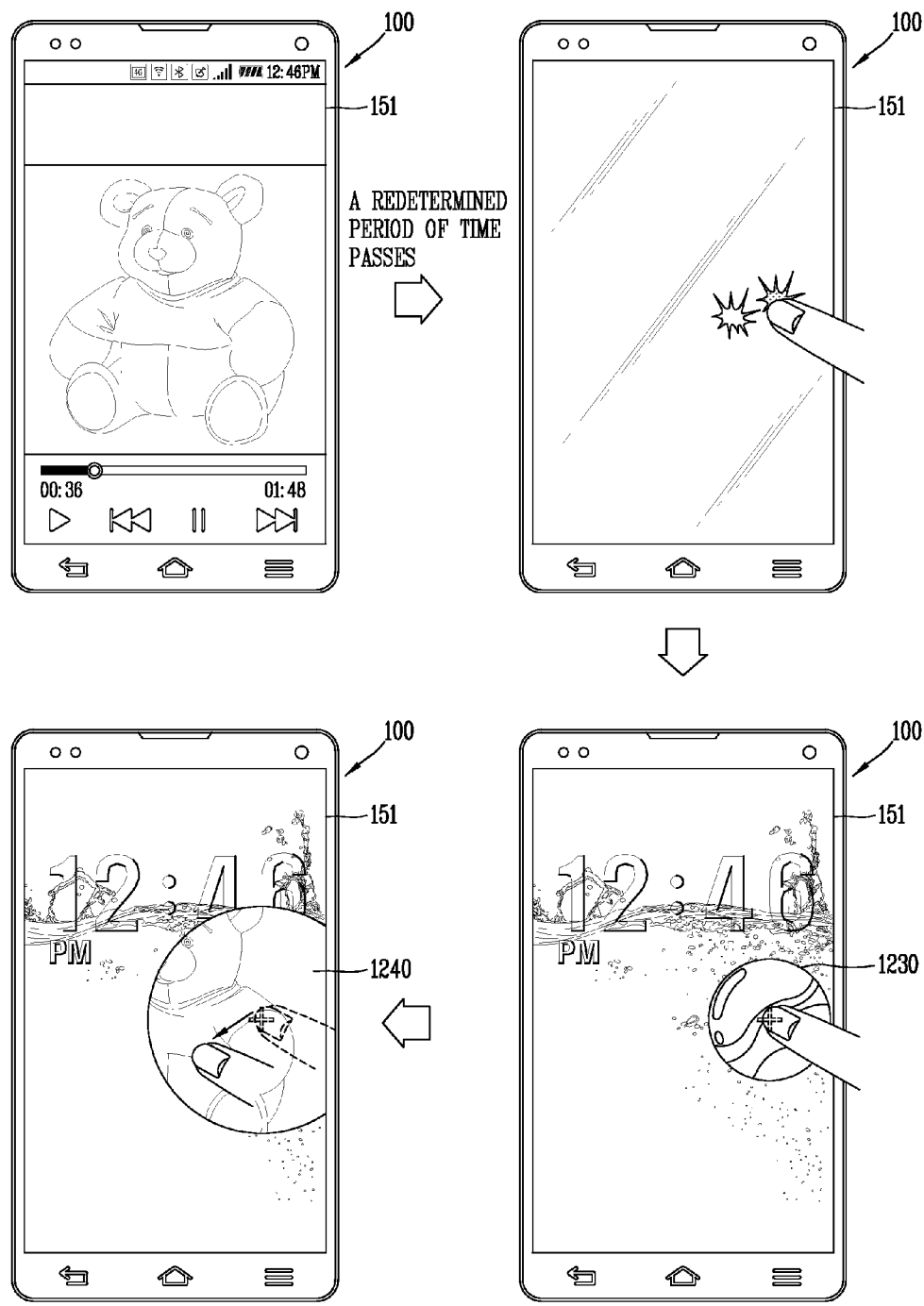

Further, referring to FIG. 12C, the mobile terminal 100 may display screen information on the display unit 151. Here, the screen information as a graphic image that can be displayed on the display unit 151 is irrelevant to the type thereof. For example, the screen information may be an execution screen of a video play application.

Unless a user's control command is entered for a predetermined period of time while displaying the screen information, the automatic lock function is executed to store the screen information. The screen information stored in the memory 160 is screen information while executing the automatic lock function. In other words, an execution screen that has finally been seen by the user will be stored therein.

Referring to FIG. 12C, an automatic lock function is executed to switch the display unit 151 to an inactive state. Then, when a preset user input is sensed and the last tap of a plurality of taps contained in the preset user input is held, the display unit 151 may be activated to display a lock screen. Here, the lock screen refers to an image formed to block or limit the exposure of a specific screen (for example, a standby screen, a home screen page, etc.) or another screen information.

Referring to FIG. 12C, the controller 180 can sense a touch corresponding to the last tap. At this time, the controller 180 can switch one region of the lock screen based on the touch to part of screen information stored in the memory 160. In other words, the display unit 151 displays part of the screen information instead of the lock screen in one region extended to a preset extent by including the touched position.

One region of the display unit 151 switched based on a touch is defined as a switching range. The size of the switching range may be implemented to be slightly larger than the size of an end of an adult index finger. The switching range may be formed in a circular shape extended by the same length based on the touched position, but is not limited to this. In other words, it may be formed in various shapes such as a triangle, a rectangle, a star shape, a water drop shape, an outline of a person, and the like.

The switching range in which part of the screen information is displayed may be formed to feel a three-dimensional effect. In other words, the screen information of the switching range may be displayed to be protruded than the remaining region of the lock screen. For example, the switching range may be formed in a water drop shape, and screen information over the switching range may be displayed like being projected into a water drop. Accordingly, when touching the display unit 151, the user can feel the aesthetic sense of forming a water drop.

Also, a touch corresponding to the last tap consecutively moves from a first location to a second location, the switching range may be extended. When a drag input moving in the direction of being away from the first location is sensed, the switching range is extended in the direction of dragging. In other words, the extent of part of screen information being switched from the lock screen is increased.

Also, when a drag input moving in the direction of being closer to the first location, the size of the switching range is reduced again. In other words, the size of the switching range may be adjusted based on the direction of the drag input. Accordingly, screen information that has been displayed prior to executing the automatic lock function may be regarded as part of the preset image, thereby allowing the user to conveniently receive simple information without executing the screen-on function.

Further, when a drag moved to the second location is released, the controller 180 can execute a screen-on function, and set an active time based on a distance between the first and the second location. A method of setting the active time has been described with reference to FIG. 12A, and thus the description thereof will be omitted.

Further, when a drag input moved to the second location is released but a distance between the first and the second location is shorter than a distance corresponding to the minimum time, the controller 180 can continuously display the lock screen without executing the screen-on function. The screen-on function can be executed using a drag input as well as the lock screen and screen information stored in the memory can be displayed at the same time, thereby providing a dynamic interface.

Figure 13:
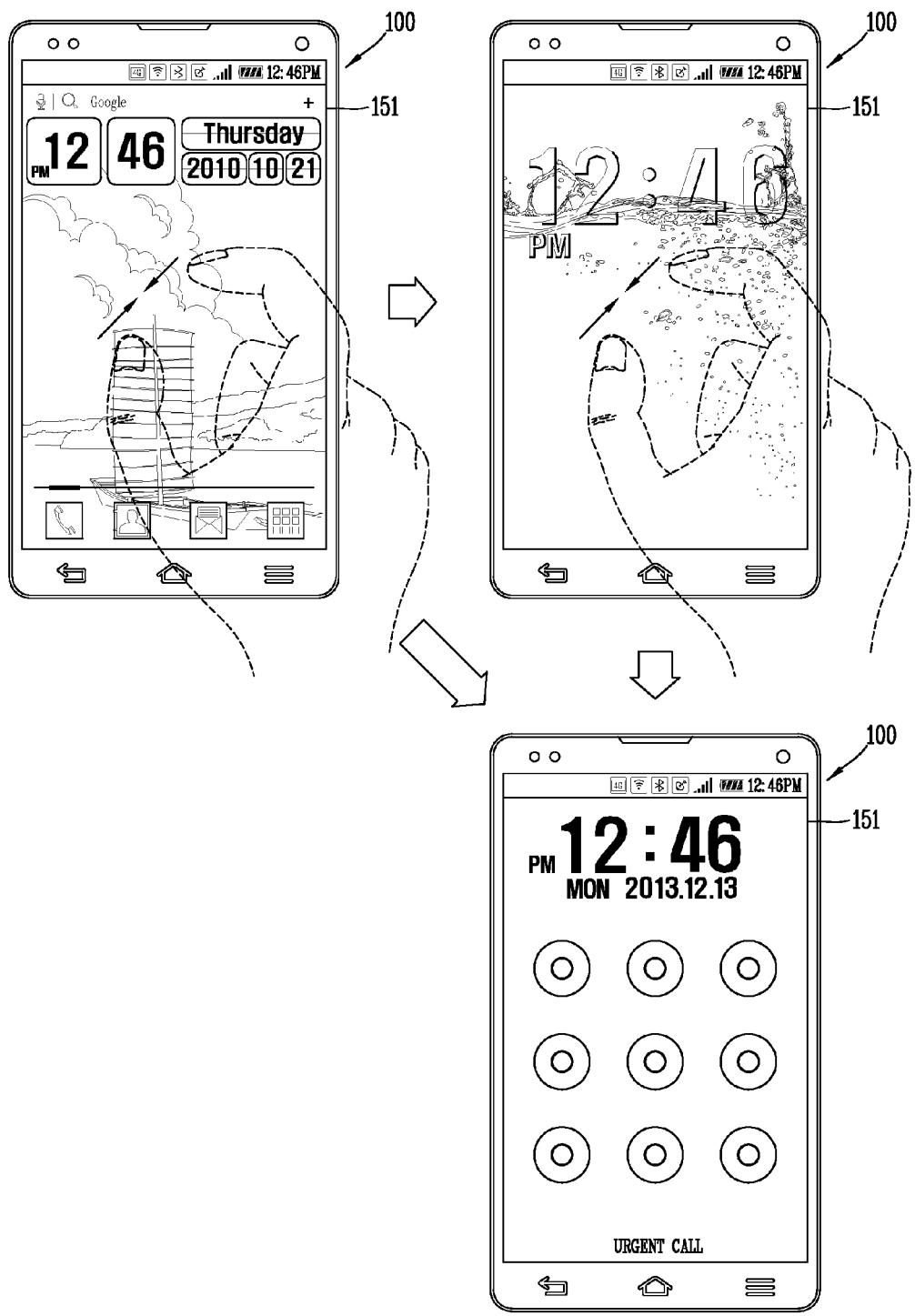
FIG. 13 is a conceptual view illustrating a method of adjusting the level of a lock state based on a user input in a mobile terminal according to an embodiment of the present invention.

FIG. 13 is a conceptual view illustrating a method of adjusting the level of a lock state based on a user input in a mobile terminal according to an embodiment of the present invention. In particular, the controller 180 can gradually implement the security status of the terminal. For example, the security status may be gradually implemented with a release state in which a control command can be applied using a touch, a first security state in which an input of control command using a touch is restricted, a second security state in which an input of control command using a touch is restricted and an input of relatively simple password (for example, a password input of less than 8 digits, a touch trajectory) is required, a third security state in which an input of relatively complicated password (for example, a password input of above 8 digits, fingerprint recognition, face recognition, voice recognition, etc.) is required, and the like.

Further, when a first and a second touch concurrently applied to locations separated from each other while the display unit 151 is in an active state are consecutively move in the direction of being closer to each other, the controller 180 can change the foregoing security status of the terminal. In other words, upon sensing a pinch-in gesture in which two fingers move closer to each other while being in contact with the, the controller 180 gradually change the security status. For example, as illustrated in FIG. 13, a release state in which a control command can be applied using a touch may be changed to a first security status in which the lock screen is displayed using a pinch-in gesture or a second security state in which an input of password is required. As a result, the user can change the security status (or security level) using a simple method.

Further, the controller 180 can control at least part of information displayed as an execution screen during the execution of a specific application to be displayed on the lock screen. FIGS. 14A, 14B, 14C, 15A and 15B are conceptual views illustrating a method of adding content selected by a user input to a lock screen, and updating the content displayed on the lock screen in real time.

The controller 180 can execute any one of a plurality of applications installed in the mobile terminal, and display a graphic user interface (GUI) of the application being executed on the display unit 151. The execution screen may include visual information produced by applications or received from a server, and implemented in the form of images, video, text and icons. For example, when a text application is executed, various forms of messages according to the text/multimedia message incoming and outgoing can be displayed as visual information.

Further, the controller 180 can select visual information to be added to the lock screen based on a user input when the execution screen is displayed. For example, a first through a third touch may be concurrently applied to locations separated from one another on the display unit 151 while the execution screen is displayed. When the first through the third touch consecutively move in the direction of being closer to one another, visual information displayed in a region at which the first through the third touch are located may be selected. Such a user input for selecting visual information may be referred to as a "three finger pinch-in".

Further, visual information selected by the three finger pinch-in may be added to one region of the lock screen while at the same time releasing the first through the third touch. In other words, the controller 180 can display the selected visual information on the lock screen when the lock screen is displayed on the display unit 151. The function is referred to as an "app snapshot" function.

Also, the size and location of a region displayed with the selected visual information on the lock screen may be changed in various ways. Further, in order to display the selected visual information on the lock screen, the controller 180 can execute an application associated therewith as a background of the display unit. In other words, an application can be executed in a multitasking mode while displaying the lock screen, and visual information displayed on the lock screen can be updated in real time based on information produced by the application.

In addition, there may be various visual information added to the lock screen using an app snapshot function, and the controller 180 can different visual information to the lock screen based on the type of an application being executed and a region to which a three finger pinch-in is applied within the execution screen.

Figure 14A:
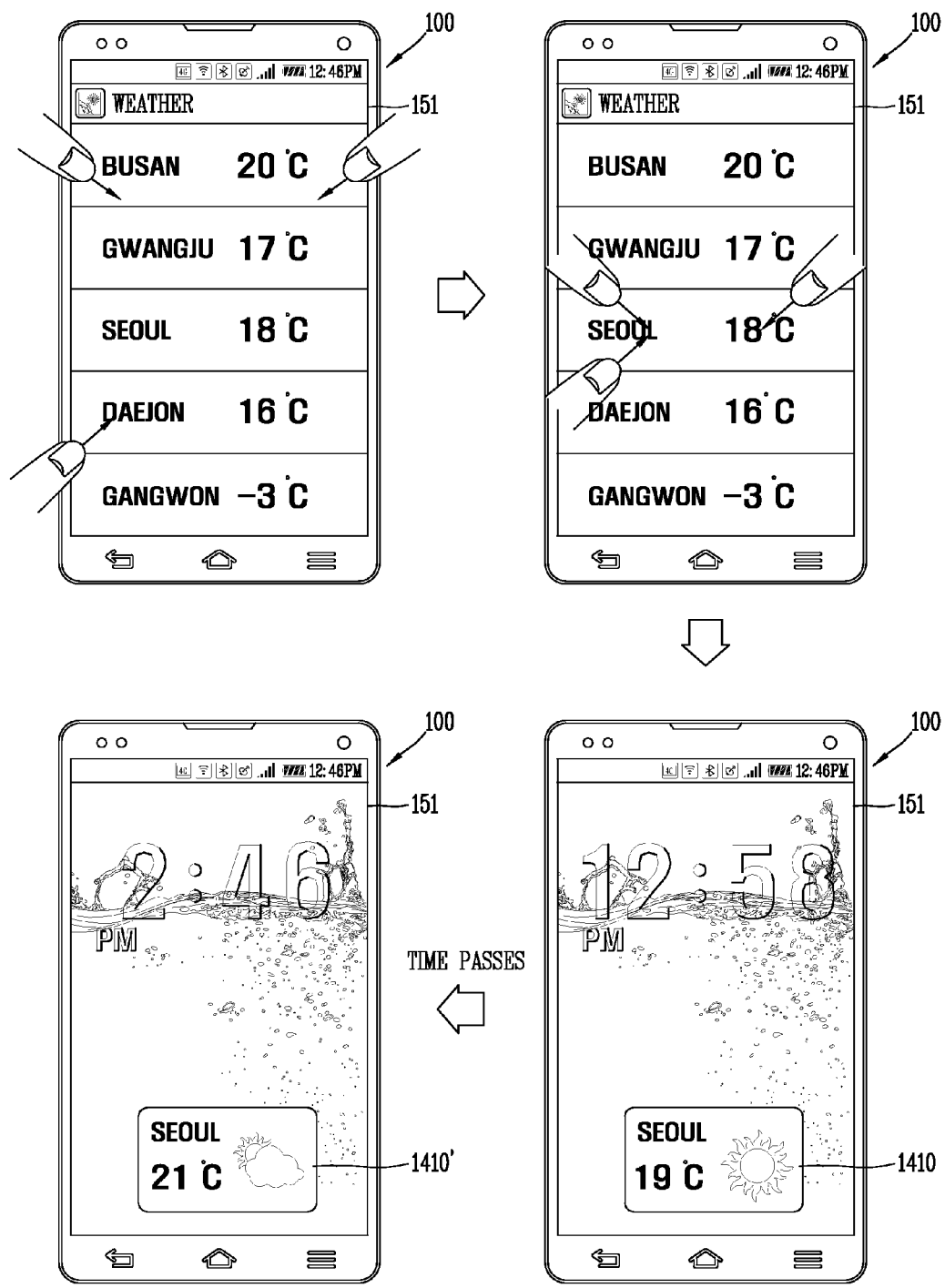
FIGS. 14A, 14B, 14C, 15A and 15B are conceptual views illustrating a method of adding content selected by a user input to a lock screen, and updating the content displayed on the lock screen in real time.

According to an embodiment, when a weather application is executed as illustrated in FIG. 14A, weather information on a plurality of cities may be displayed in a list form. Subsequently, when "Seoul" is selected using a three finger pinch-in, an app snapshot function for the selected weather information of "Seoul" is executed. In other words, the weather information of "Seoul" is displayed in real time on the lock screen.

Figure 14B:
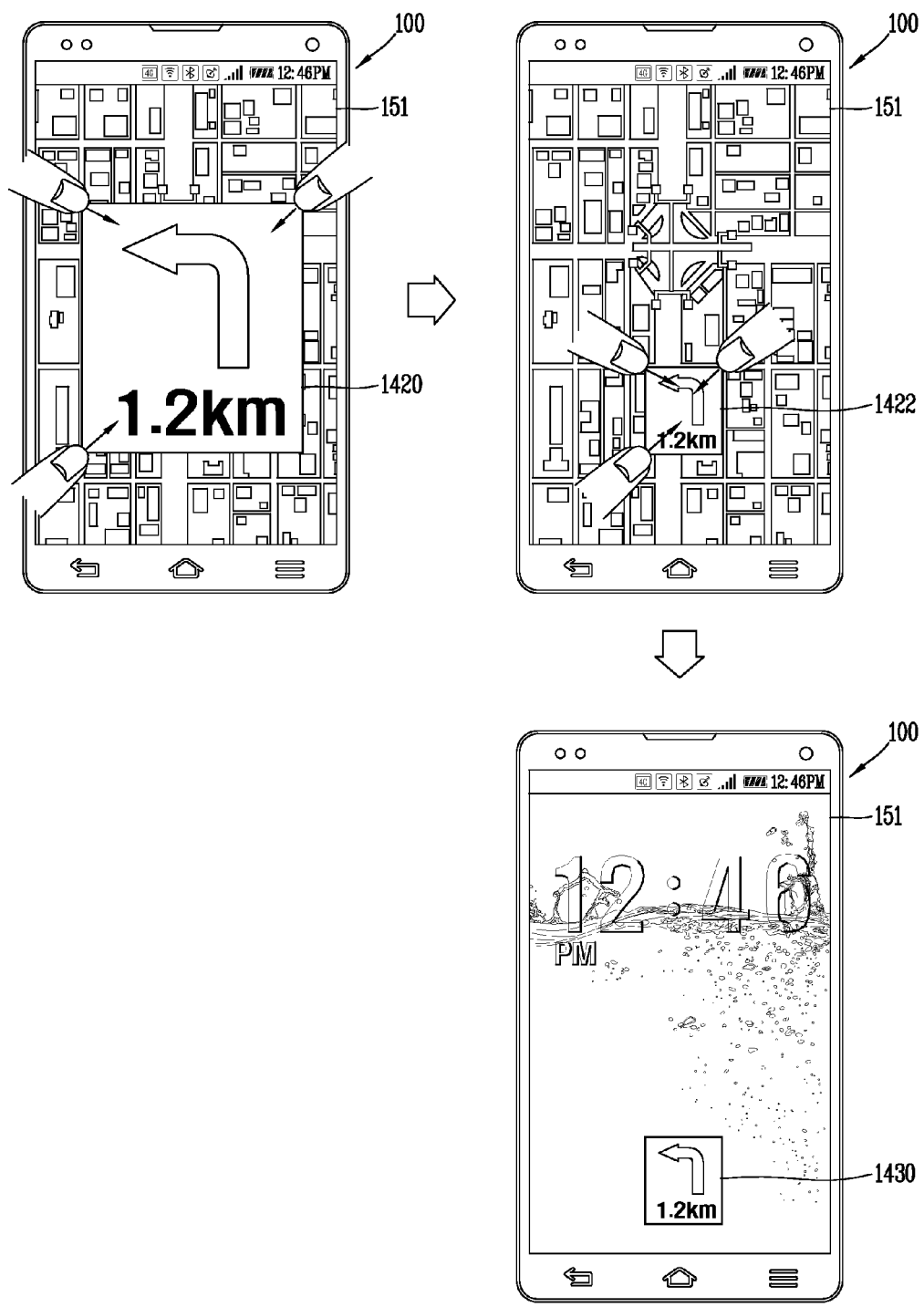

According to an embodiment, as illustrated in FIG. 14B, upon executing a navigation application, navigation information 1420 for guiding a route may be displayed on the execution screen, and the navigation information 1420 may be selected using a three finger pinch-in. Further, the size of a region in which the selected navigation information is displayed on the lock screen may vary according to a user input. For example, subsequent to selecting the navigation information 1420 using a three finger pinch-in, the size of a region displayed on the lock screen may be changed according to the movement of a first through a third touch contained in the three finger pinch-in.

In other words, as illustrated in FIG. 14B, when the first through the third touch move in the direction of being closer to one another when the navigation information 1420 is selected, the size of a region displayed on the lock screen may be reduced (1420→1422'). On the contrary, when the first through the third touch move in the direction of being away from one another, the size of a region displayed on the lock screen may be enlarged.

Further, when the first through the third touch are released, the controller 180 performs an app snapshot function for the navigation information 1420, and sets the size of a region 1430 in which the navigation information is displayed on the lock screen.

Figure 14C:
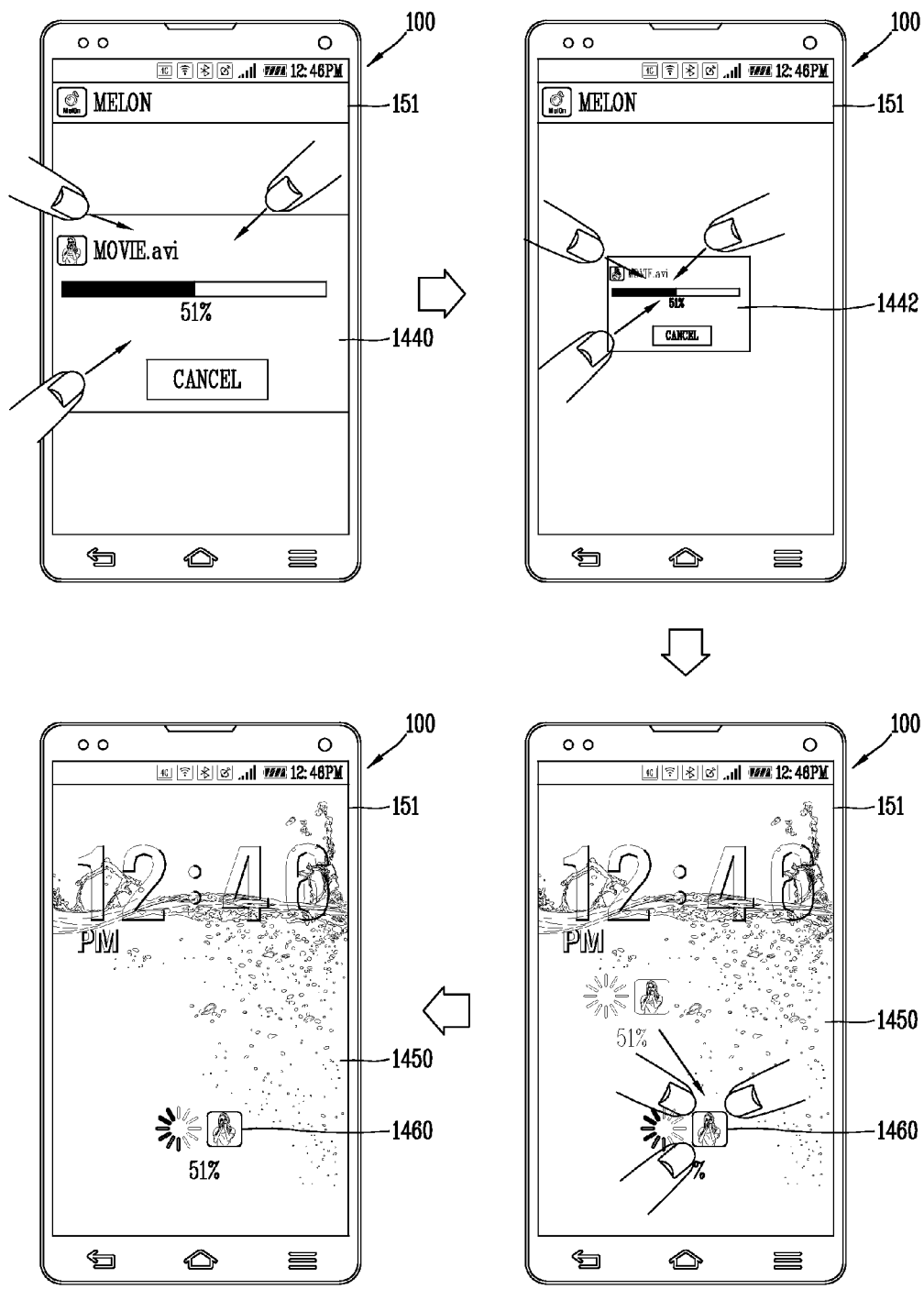

According to an embodiment, as illustrated in FIG. 14C, a progress bar 1440 according to the download of data or the installation of an application may be selected using a three finger pinch-in. Subsequently, the size of a region 1142 displayed on the lock screen may be changed according to the movement of the first through the third touch contained in the three finger pinch-in.

Furthermore, as illustrated in FIG. 14C, when the first through the third touch consecutively move in a parallel direction, the controller 180 can display the lock screen 1450 instead of the execution screen on the display unit 151. At this time, the display location of visual information 1460 to be added to the lock screen 1450 may be changed according to the movement of the first through the third touch. Upon releasing the first through the third touch, the controller 180 executes an app snapshot function, and adds visual information to a region from which the first through the third touch are released.

Figure 15A:
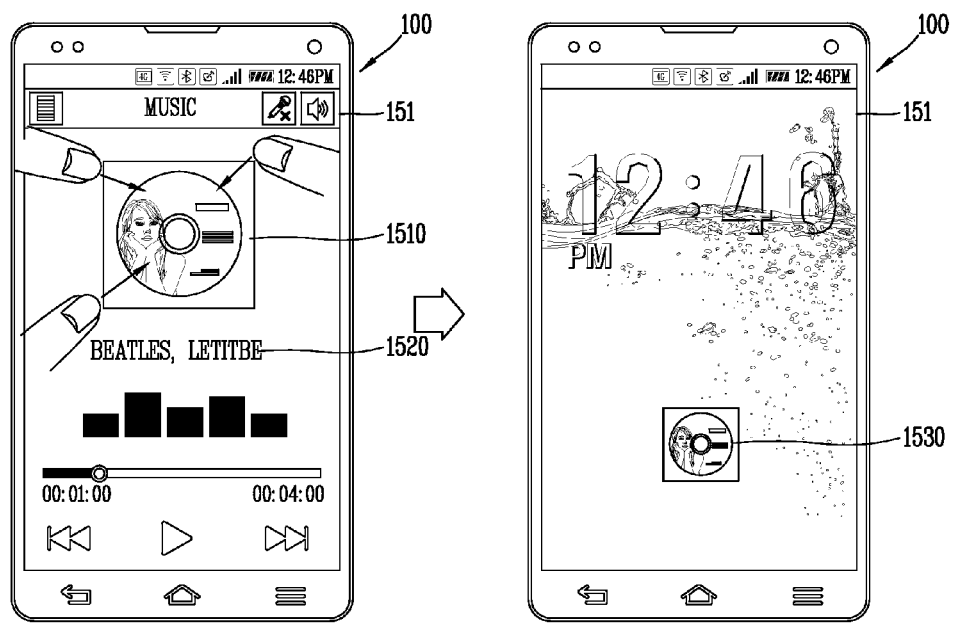

Further, one execution screen may include a plurality of visual information, and the controller 180 can select any one of the plurality of visual information based on a three finger pinch-in. For example, when a play function is executed in a music application, a plurality of visual information corresponding to a brief information 1520, an album jacket 1510, a lyric, and the like of played music can be displayed on the play screen. Meanwhile, as illustrated in FIG. 15A, when the album jacket 1510 is selected using a three finger pinch-in, the album jacket of the played music can be displayed in real time on the lock screen.

Figure 15B:
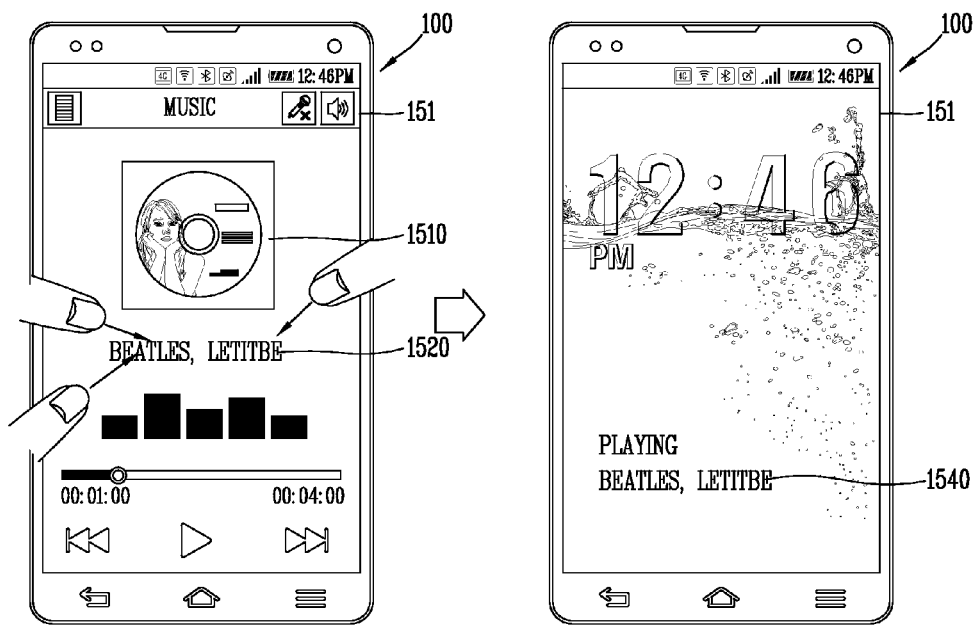

In addition, as illustrated in FIG. 15B, when the brief information 1520 is selected using a three finger pinch-in, the brief information of the played music can be displayed as information 1540 in real time on the lock screen. Further, visual information added to the lock screen while the music application is active may be continuously updated. In other words, when the music application is terminated, visual information added to the lock screen afterwards may be excluded from the lock screen.

In addition, an execution screen according to the execution of a specific application can be displayed in a partial region of the lock screen even in a lock state, thereby conveniently receiving brief information even without releasing the lock state. Furthermore, information updated in real time can be received even in a lock state, and the location, size and the like displayed with screen information can be changed, thereby arranging the information according to user's convenience. A display range displayed with the execution screen can also be controlled to release a lock state while at the same time activating an application corresponding to the execution screen, thereby allowing the user to more conveniently to operate the mobile terminal.

Figure 16:
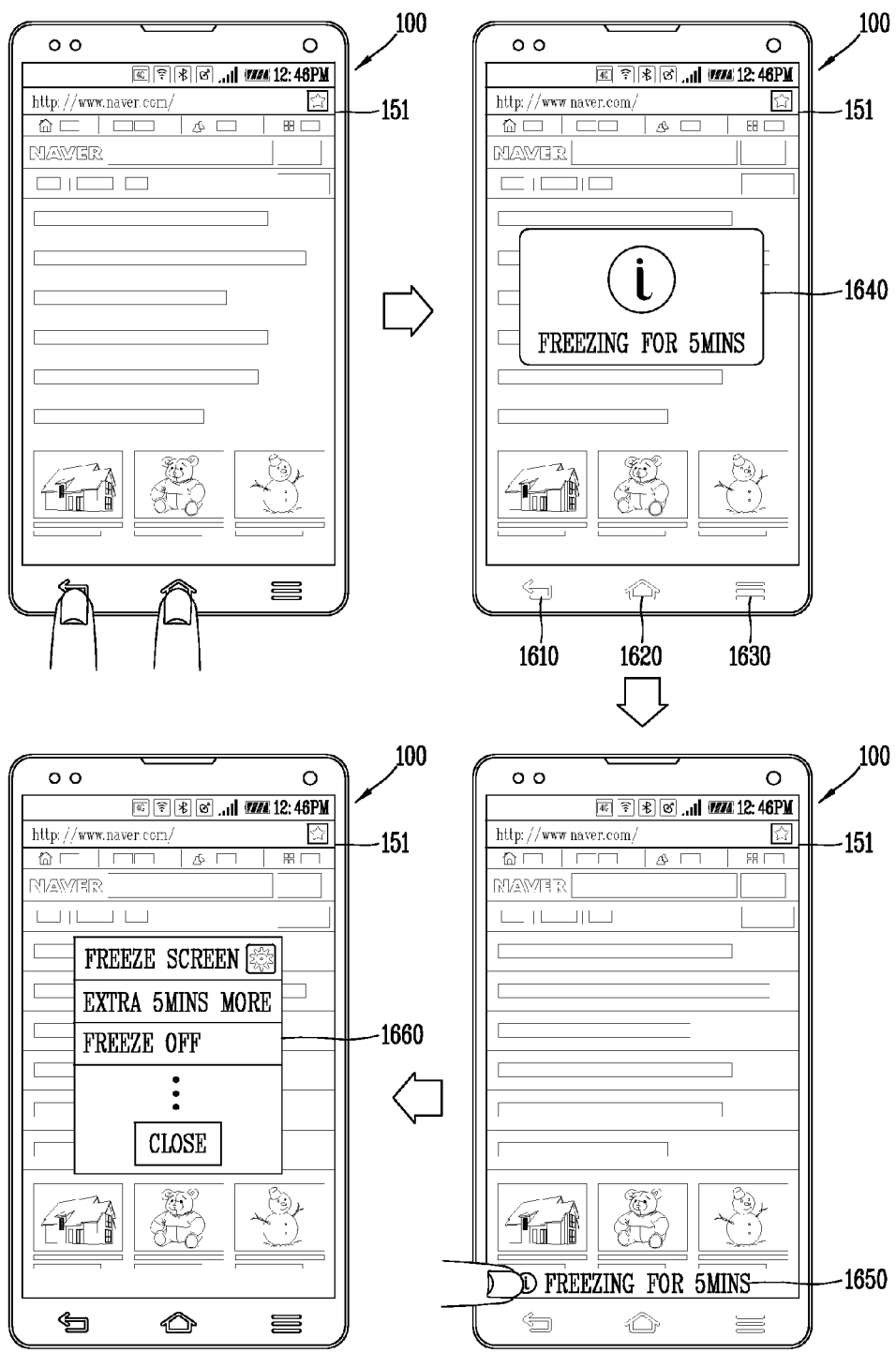
FIG. 16 is a conceptual view illustrating a screen freeze function executed in a mobile terminal according to an embodiment of the present invention.

FIG. 16 is a conceptual view illustrating a screen freeze function executed in a mobile terminal according to an embodiment of the present invention. A navigation key for controlling the terminal may be disposed on a front surface of the mobile terminal. The key may include at least one of a back key for displaying a previous screen, a home key for displaying a home screen page, and a menu key for displaying a menu. The key may be formed into a physical form on the body as well as displayed with an icon (or soft key) on the display unit 151.

When a touch is concurrently applied to at least two keys of a plurality of keys contained in the navigation key as illustrated in FIG. 16A, the controller 180 can execute a screen freeze function. Upon executing the screen freeze function, an input of control command is restricted while the display unit 151 is in an active state. However, an input of scroll command for moving the content displayed on the display unit 151 in a vertical or horizontal direction will not be restricted. In other words, an input of the remaining commands excluding the scroll command will be restricted.

For example, as illustrated in FIG. 16I, if a screen freeze function is executed while displaying a web page including a plurality of hyperlinks, the controller 180 does not display a web page connected to a specific hyperlink even when sensing a touch to the hyperlink. In other words, the controller 180 ignores a touch applied to the display unit 151 when the screen freeze function is executed. However, when entering a flicking input for scrolling, the controller 180 can execute a scroll function based on the flicking input. As a result, it is possible to prevent an unintentional link from being clicked or an icon from being selected using a touch.

Further, as illustrated in FIGS. 16B and 16C, upon executing a screen freeze function, the controller 180 can display information 1640, 1650 associated with the screen freeze function. For example, information associated with the screen freeze function may include whether or not the screen freeze function is active, a time at which the screen freeze function is activated (or the screen freeze function is terminated), a menu for deactivating the screen freeze function or extending the time, and the like.

Upon entering a touch to the menu, the controller 180 can display a detailed menu 1660 associated with the screen freeze function as illustrated in FIG. 16D. A user may extend an active time of the screen freeze function or deactivate the screen freeze function using the detailed menu.

Furthermore, the controller 180 can deactivate a navigation key 1610-1630 in response to the execution of the screen freeze function, and turn off illumination provided within the navigation key. As a result, the user can recognize that the navigation key is not operated.

As described above, the controller 180 can cancel an automatic lock function in response to a tap applied to the terminal body or an object placed with the body when an automatic lock function is executed, thereby enhancing user convenience. Furthermore, upon executing the screen-on function, screen information that has been displayed prior to executing the automatic lock function can be redisplayed, thereby solving the user's need for rechecking the screen information that has been previously displayed. In addition, a mobile terminal according to an embodiment of the present invention may set an active time for which the display unit 151 maintains an active state based on the characteristic of the sensed tap, thereby providing an intuitive interface environment for the user.

According to an embodiment of present invention, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
   a touch screen comprising a display and a touch sensor, and configured to sense a touch applied to the touch screen;
   an acceleration sensor configured to sense a movement of the mobile terminal; and
   a controller configured to:
   activate the touch screen in which illumination is turned on,
   display screen information on the activated touch screen,
   execute a lock function and turn off the display upon no touch being performed on the touch screen for a predetermined time period,
   in response to a predetermined number of successive tap inputs being sensed by the acceleration sensor or the touch sensor within a reference time period after the display is turned off, turn on the display and display a lock screen corresponding to the lock function,
   in response to a last tap inputs among the predetermined number of successive tap inputs sensed by the acceleration sensor or the touch sensor being held on the touch screen for more than a predetermined period of time, display a peek area on the lock screen, wherein the peek area includes a first portion of the screen information previously displayed on the activated touch screen,
   in response to the last tap input being dragged a distance away from a hold location of the last tap input, increase a size of the peek area based on the distance away from the hold location and display the first portion of the screen information and a second portion of the screen information within the peek area on the lock screen, and
   maintain the display to be turned off or display the lock screen when a user input which does not match the predetermined number of successive tap inputs is sensed within the reference time period or the predetermined number of successive tap inputs is sensed after the reference time period.

2. The mobile terminal of claim 1, wherein the controller is further configured to:
   deactivate the touch screen by gradually adjusting a brightness of the illumination until the illumination is turned off, by immediately turning the illumination off, or by dimming the brightness of the illumination for the reference time period.

3. The mobile terminal of claim 1, wherein the controller is further configured to:
   reactivate the touch screen for an amount of time when the predetermined number of successive tap inputs is sensed by the touch screen within the reference time period.

4. The mobile terminal of claim 3, wherein the amount of time is varied based on a tap intensity contained in the predetermined number of successive tap inputs.

5. The mobile terminal of claim 3, wherein the controller is further configured to:
   display guide information on the reactivated touch screen including the amount of time the touch screen will be reactivated using at least one of a visual, tactile, and auditory scheme.

6. The mobile terminal of claim 4, wherein the controller is further configured to:
   maintain the touch screen as reactivated until a touch screen power on off button disposed on one surface of the terminal body is selected, in response to the predetermined number of successive tap inputs including a number of taps greater than a predetermined value.

7. The mobile terminal of claim 3, wherein the controller is further configured to:
   display a graphic object indicating the amount of time the touch screen will be reactivated on the screen information based on the predetermined number of successive tap inputs.

8. The mobile terminal of claim 7, wherein in response to a touch sensed on the touch screen at a first position consecutively moving to a second position when the graphic object is displayed, the controller is further configured to set the amount of time the touch screen will be reactivated based on a moving distance of the sensed touch.

9. The mobile terminal of claim 1, wherein the controller is further configured to:
   display at least one shortcut icon for executing a corresponding application on the displayed screen information in response to the predetermined number of successive tap inputs.

10. The mobile terminal of claim 9, wherein a type of the at least one shortcut icon varies according to previously displayed screen information.

11. The mobile terminal of claim 1, wherein the controller is further configured to:
    display a lock screen corresponding to the lock function when the touch screen is deactivated, and
    release a lock state of the touch screen when the predetermined number of successive tap inputs corresponds to a preset condition.

12. The mobile terminal of claim 11, wherein the controller is further configured to:
reactivate the touch screen and display the lock screen on the touch screen when the predetermined number of successive tap inputs does not match the preset condition.

13. A method of controlling a mobile terminal comprising an acceleration sensor configured to sense a movement of the mobile terminal, the method comprising:
activating, via a controller, a touch screen in which illumination is turned on, said touch screen comprising a display and a touch sensor, and configured to sense a touch applied to the touch screen;
displaying, via the controller, screen information on the activated touch screen;
turning off, via the controller, the display and executing a lock function upon no touch being performed on the touch screen for a predetermined time;
in response to a predetermined number of successive tap inputs being sensed by the acceleration sensor or the touch sensor within a reference time period after the display is turned off, turning on the display and displaying a lock screen corresponding to the lock function;
in response to a last tap input among the predetermined number of successive tap inputs sensed by the acceleration sensor or the touch sensor being held on the touch screen for more than a predetermined period of time, displaying a peek area on the lock screen, wherein the peek area includes a first portion of the screen information previously displayed on the activated touch screen;
in response to the last tap input being dragged a distance away from a hold location of the last tap input, increasing a size of the peek area based on the distance away from the hold location and displaying the first portion of the screen information and a second portion of the screen information within the peek area on the lock screen; and
maintaining the display to be turned off or display the lock screen when a user input which does not match the predetermined number of successive tap inputs is sensed within the reference time period or the predetermined number of successive tap inputs is sensed after the reference time period.

14. The method of claim 13, wherein the step of turning off the display comprises:
deactivating the touch screen by gradually adjusting a brightness of the illumination until the illumination is turned off, by immediately turning the illumination off, or by dimming the brightness of the illumination for the reference time period.

15. The method of claim 13, further comprising:
reactivating the touch screen for an amount of time when the predetermined number of successive tap inputs is sensed by the touch screen within the reference time period.

16. The method of claim 15, wherein the amount of time corresponds to a tap intensity contained in the predetermined number of successive tap inputs.

17. The method of claim 16, further comprising:
maintaining the touch screen as reactivated until a touch screen power on off button disposed on one surface of the terminal body is selected, in response to the predetermined number of successive tap inputs including a number of taps greater than a predetermined value.

18. The method of claim 15, further comprising:
displaying guide information on the reactivated touch screen including the amount of time the touch screen will be reactivated using at least one of a visual, tactile, and auditory scheme.

19. The method of claim 15, further comprising:
displaying a graphic object indicating the amount of time the touch screen will be reactivated on the screen information based on the predetermined number of successive tap inputs.

20. The method of claim 19, wherein in response to a touch sensed on the touch screen at a first position consecutively moving to a second position when the graphic object is displayed, the method further comprises setting the amount of time the touch screen will be reactivated based on a moving distance of the sensed touch.

* * * * *